(12) United States Patent
Yamamoto et al.

(10) Patent No.: US 11,717,090 B2
(45) Date of Patent: Aug. 8, 2023

(54) ARMREST AND SEAT WITH ARMREST

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

(72) Inventors: Satoshi Yamamoto, Mie (JP); Hidetoshi Ishida, Mie (JP); Kaho Hayashi, Mie (JP); Hideki Oshima, Aichi (JP); Takemasa Okumura, Gifu (JP); Takahiko Endo, Gifu (JP); Jun Jin, Gifu (JP); Keiji Makino, Gifu (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); SUMITOMO RIKO COMPANY LIMITED, Aichi (JP); TOKAI CHEMICAL INDUSTRIES, LTD., Gifu (JP)

( * ) Notice: Subject to any disclaimer, the term of this patent is extended or adjusted under 35 U.S.C. 154(b) by 0 days.

(21) Appl. No.: 17/437,522

(22) PCT Filed: Feb. 21, 2020

(86) PCT No.: PCT/JP2020/007067
§ 371 (c)(1),
(2) Date: Sep. 9, 2021

(87) PCT Pub. No.: WO2020/184151
PCT Pub. Date: Sep. 17, 2020

(65) Prior Publication Data
US 2022/0142371 A1 May 12, 2022

(30) Foreign Application Priority Data
Mar. 11, 2019 (JP) .................. 2019-044039

(51) Int. Cl.
*A47C 7/54* (2006.01)
*A47C 7/72* (2006.01)

(52) U.S. Cl.
CPC ............ *A47C 7/543* (2013.01); *A47C 7/72* (2013.01)

(58) Field of Classification Search
CPC .. A47C 7/543; A47C 7/54; A47C 7/72; B60N 3/00; B60N 2/753; B60N 2002/0264
(Continued)

(56) References Cited

U.S. PATENT DOCUMENTS 5,924,515 A * 7/1999 Stauffer ................. A01D 67/04
180/326
11,186,211 B2 * 11/2021 Yamamoto ............. B60N 2/753
(Continued)

FOREIGN PATENT DOCUMENTS

| JP | 2001-045641 A | | 2/2001 |
| JP | 2016-107686 A | | 6/2016 |
| JP | 2018-069777 A | | 5/2018 |
| JP | 2018-199409 A | | 12/2018 |
| JP | 2019-140787 | * | 8/2019 |

OTHER PUBLICATIONS

ISR issued in WIPO Patent Application No. PCT/JP2020/007067, dated Apr. 21, 2020, English translation.

*Primary Examiner* — Mark R Wendell
(74) *Attorney, Agent, or Firm* — Greenblum & Bernstein, P.L.C.

(57) ABSTRACT

An armrest described herein includes an arm-side wire harness including an electric wire and an arm-side connector that is on an end of the electric wire and is to be coupled to a seat-side connector mounted on a seat. The armrest further includes an arm body member including an electric wire routing cavity in which the electric wire of the arm-side wire harness is arranged and a seat-side wall that is to be arranged opposite a seat frame of the seat. The arm body member is to be fixed to the seat frame while the seat-side wall being opposite the seat frame. The seat-side wall includes a connector insertion hole through which the arm-side connector can be inserted. The arm body member includes an operation hole that is continuous from the connector insertion hole via an arrangement section of the electric wire routing cavity.

6 Claims, 24 Drawing Sheets

(58) Field of Classification Search
USPC .................................................... 297/217.3
See application file for complete search history.

(56) References Cited

U.S. PATENT DOCUMENTS

| | | | |
|---|---|---|---|
| 11,299,078 B2* | 4/2022 | Yamamoto | A47C 7/54 |
| 11,325,514 B2* | 5/2022 | Yamamoto | A47C 7/72 |
| 2022/0185158 A1* | 6/2022 | Yamamoto | B60N 2/79 |
| 2022/0250519 A1* | 8/2022 | Yamamoto | B60N 3/00 |

* cited by examiner

ARMREST AND SEAT WITH ARMREST

TECHNICAL FIELD

The technology disclosed herein relates to an armrest including a wire harness and a seat with the armrest.

BACKGROUND ART

An armrest described in Japanese Unexamined Patent Application Publication No. 2016-107686 (Patent Document 1 described below) has been known as an armrest that is to be mounted in a vehicle. Such an armrest is mounted on a console of the vehicle. The armrest includes a box-shaped housing member in which a connection cord is arranged. A connection terminal that is connected to an end portion of the connection cord is connected to a socket such as an USB socket. The armrest is mounted on the console and a wire harness for supplying power to the socket is routed from a vehicle body to the inside of the armrest through the console.

RELATED ART DOCUMENT

Patent Document

[Patent Document 1] Japanese Unexamined Patent Application Publication No. 2016-107686

SUMMARY OF THE INVENTION

Problem to be Solved by the Invention

One example of a process of mounting the armrest on a mount member, which is different from the console, such as a side surface of the seat is described as follows. After connecting a mount member-side connector of a mount member-side wire harness that is mounted in the mount member and an armrest-side connector of an arm-side wire harness that is mounted in the armrest, the armrest is fixed to the mount member.

However, in performing the above process, if a sufficient space for coupling the mount member-side connector and the armrest-side connector cannot be provided between the mount member and the armrest, the operability of mounting the armrest may be lowered.

The technology for improving the operability of mounting the armrest will be described.

Means for Solving the Problem

The technology disclosed herein is an armrest including an arm-side wire harness and an arm body member. The arm-side wire harness includes an electric wire and an arm-side connector that is on an end of the electric wire and is to be coupled to a mount member-side connector mounted on a mount member. The arm body member includes an electric wire routing cavity in which the electric wire of the arm-side wire harness is arranged and a mount member-side wall that is to be arranged opposite the mount member. The arm body member is to be fixed to the mount member while the mount member-side wall being opposite the mount member. The mount member-side wall includes a connector insertion hole through which the arm-side connector can be inserted. The arm body member includes an operation hole that is continuous from the connector insertion hole via the electric wire routing cavity.

According to the armrest including such a configuration, the mount member-side connector and the arm-side connector can be coupled together through the operation hole after the arm body member is fixed to the mount member such that the mount member-side wall is opposite the mount member. This improves the operability of mounting the armrest on the mount member.

Embodiments of the technology described herein may preferably include configurations as follows.

The armrest may further include a cover that is attached to the arm body member to close the operation hole.

According to such a configuration, the operation hole can be closed after the mount member-side connector and the arm-side connector are coupled together. According to such a configuration, the arm-side wire harness arranged within the arm body member can be protected and the arm body member is less likely to be reduced in strength compared to a configuration in which the operation hole is not closed.

When the arm body member is fixed to the mount member, the mount member-side connector and the arm-side connector that are coupled may be inserted in the connector insertion hole.

According to such a configuration, the arm-side connector of the arm-side wire harness is inserted in the connector insertion hole. Therefore, the electric wire connected to the mount member-side connector and the electric wire connected to the arm-side wire harness are less likely to be damaged by the hole edge of the connector insertion hole when due to vibration.

The electric wire that has a length including a coupling stroke length necessary for coupling the mount member-side connector and the arm-side connector may be arranged in the electric wire routing cavity.

Each of the wire harnesses needs to have the extra wire portion in the electric wire corresponding to the coupling stroke length to couple the mount member-side connector and the arm-side connector together. However, an additional process is necessary for dealing with the electric wire corresponding to the coupling stroke length as an extra wire portion after coupling the connectors together.

The electric wire including the extra wire portion corresponding to the coupling stroke length for coupling the mount member-side connector and the arm-side connector can be arranged in the arrangement section of the electric wire routing cavity. With such a configuration, the extra wire portion of the electric wire included in the arm-side wire harness can be easily handled. This improves the operability of mounting the armrest on the mount member.

The technology disclosed herein is a seat with an armrest including the armrest described above and the mount member. The mount member is the seat and the mount member-side connector is fixed to the mount member so as to face the connector insertion hole when the arm body member is fixed to the mount member.

According to the seat with an armrest, after the arm body member is fixed to the seat, the mount member-side connector faces the connector insertion hole. Therefore, the arm-side connector can be easily coupled to the mount member-side connector and the coupling operation can be performed more easily through the operation hole. This further improves the operability of mounting the armrest on the seat.

The arm body member may be pivotable around an axis extending from the mount member to the arm body member. The electric wire having an extra length necessary for pivoting the arm body member may be arranged in the electric wire routing cavity.

According to such a configuration, the electric wire routing cavity in which the electric wire of the *arum*-side wire harness is arranged can be commonly used as an extra wire portion arrangement section in which the extra wire portion of the electric wire caused by the pivoting of the arm body member is arranged. This simplifies the structure of the arm body member compared to a configuration separately including an extra wire portion arrangement section.

Advantageous Effects of the Invention

According to the technology disclosed herein, operability of mounting the armrest can be improved.

MODES FOR CARRYING OUT THE INVENTION

Embodiment

One embodiment of the technology described herein will be described with reference to FIGS. 1 to 23.

A seat with an armrest 10 according to this embodiment is to be mounted in a vehicle and includes a seat frame (one example of a mount member) 90 and an armrest 20 that is fixed to the seat frame 90. The seat frame 90 is included in a left side section of a seat (one example of the mount member) 80 of the vehicle.

Figure 1:
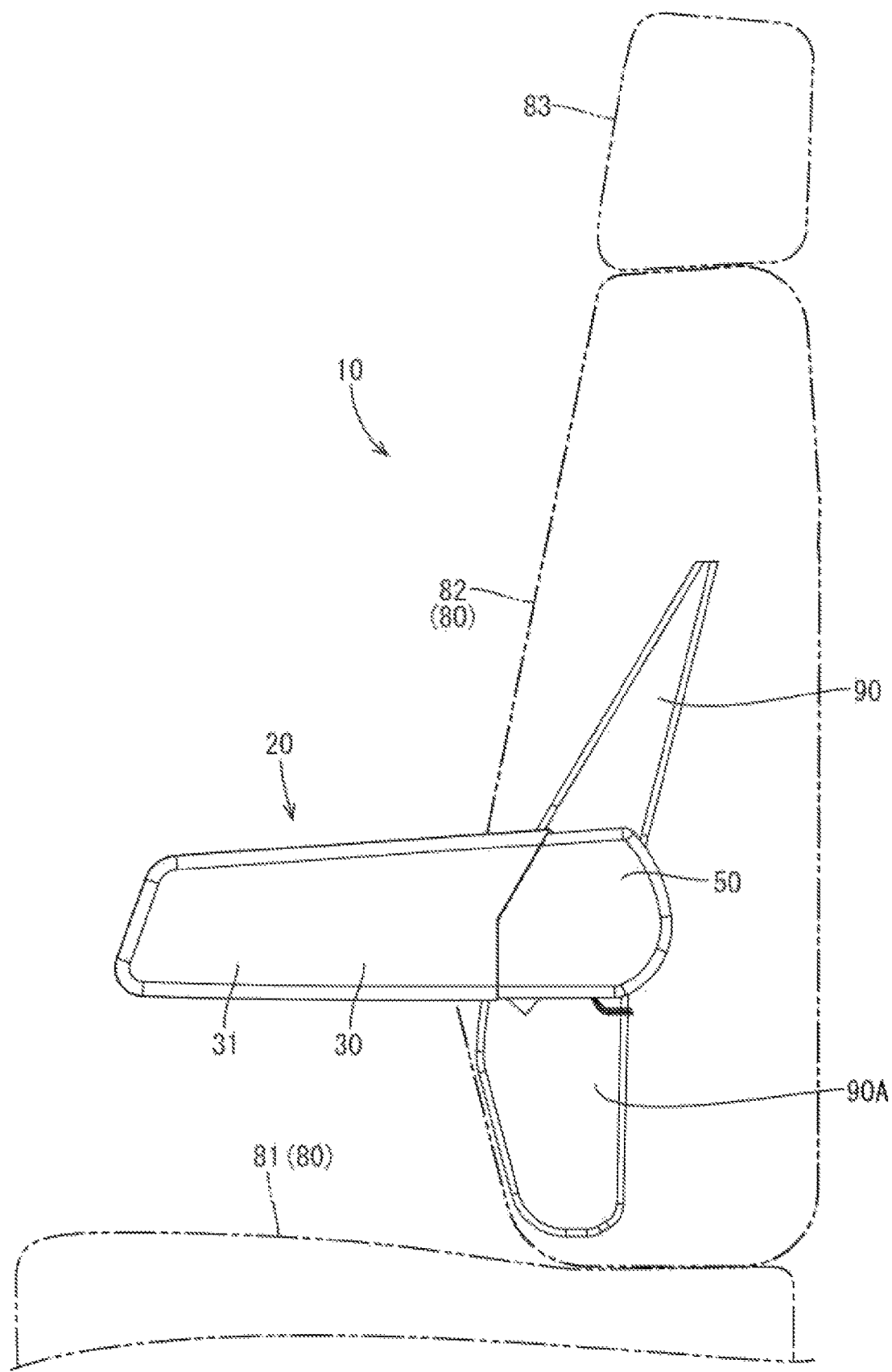
FIG. 1 is a side view illustrating a seat with an armrest.

As illustrated in FIG. 1, the seat 80 includes a seat base 81 on which a passenger is seated, a backrest 82 extending upward from a rear end portion of the seat base 81, a headrest 83 mounted on an upper end portion of the backrest 82, and a seat-side wire harness 95.

Figure 14:
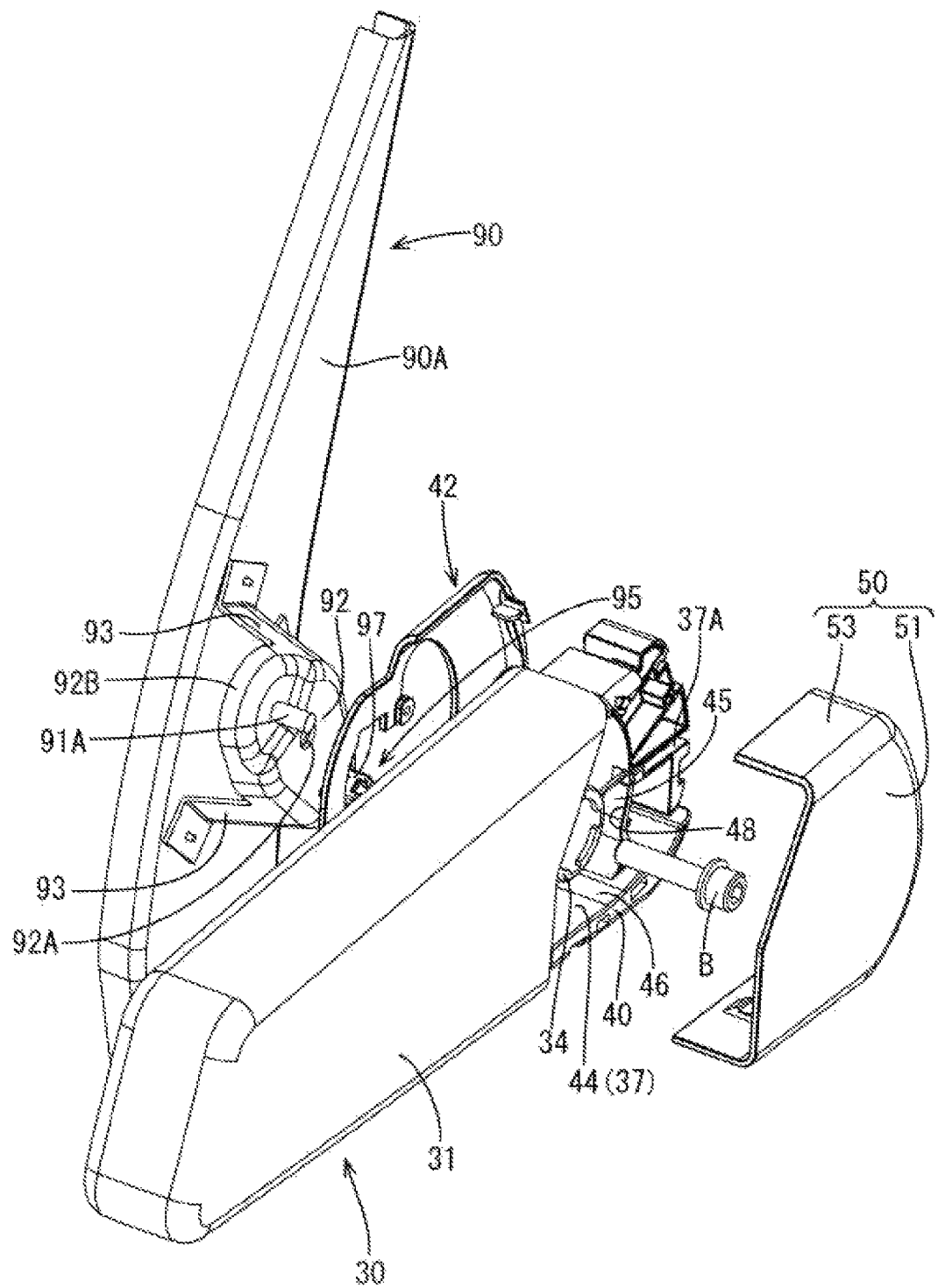
FIG. 14 is an exploded perspective view illustrating a portion of the seat with an armrest.
Figure 15:
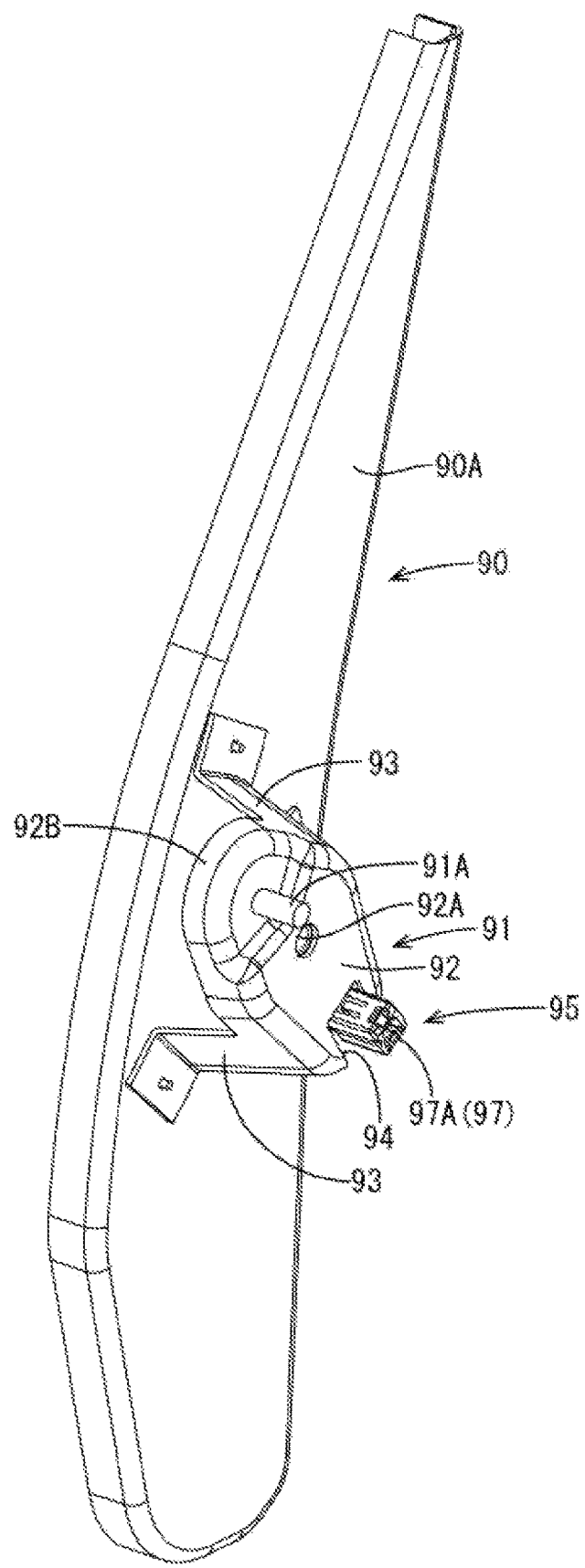
FIG. 15 is a perspective view of the seat frame.
Figure 16:
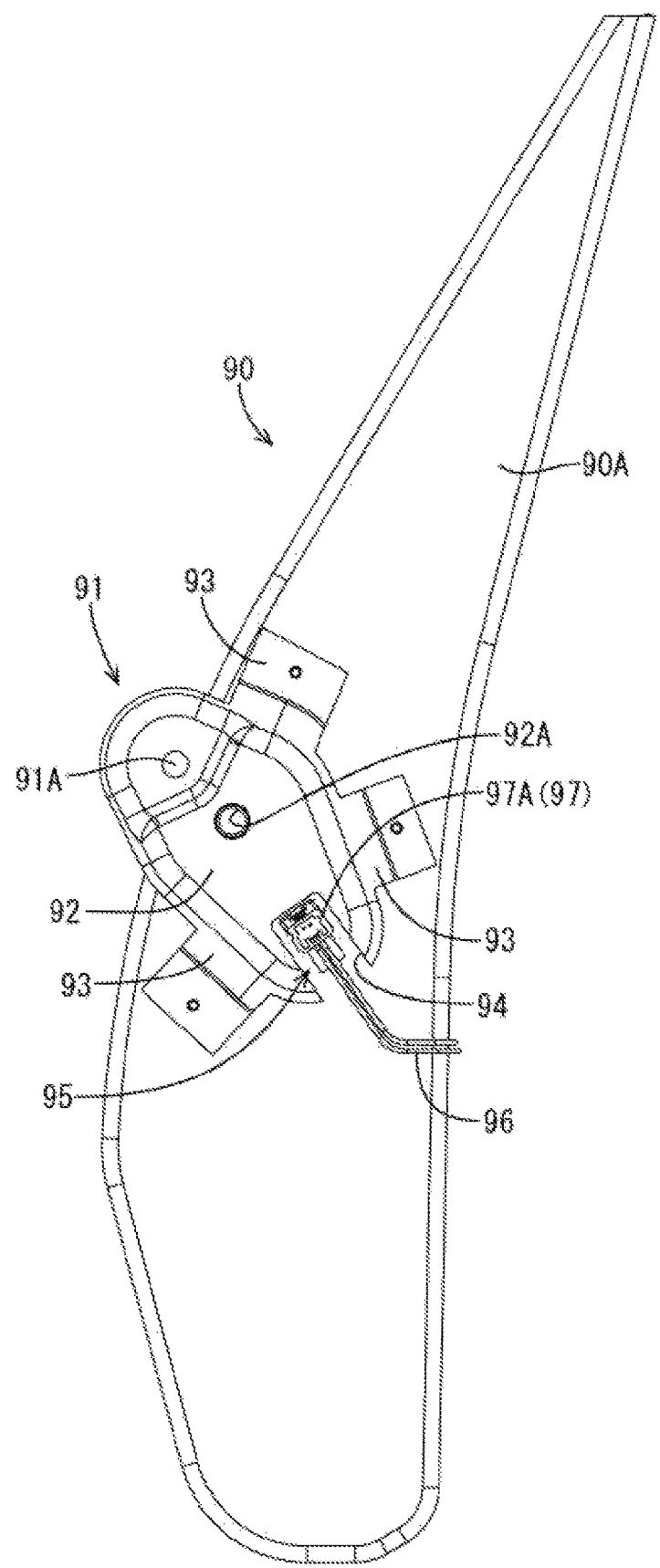
FIG. 16 is a side view of the seat frame.

The backrest 82 includes the seat frames 90 made of metal on right and left sides thereof within the backrest 82. As illustrated in FIGS. 14 to 16, the seat frame 90 is vertically elongated and includes a bracket (one example of the mount member) 91 on an outer surface 90A of the seat frame 90.

The bracket 91 is made of metal and includes a mount plate 92 that is opposite the armrest 20 in the right-left direction and fixing pieces 93 with which the bracket 91 is fixed to the seat frame 90.

The mount plate 92 has substantially an oval shape and is long in a distance between an obliquely upper front portion and an obliquely lower rear portion. The mount plate 92 is substantially parallel to and opposite the outer surface 90A of the seat frame 90. The mount plate 92 includes a bolt insertion hole 92A in a middle section thereof and the bolt insertion hole 92A extends through the mount plate 92 in a thickness direction. A support bolt B is to be inserted through the bolt insertion hole 92A to fix the bracket 91 and the armrest 20.

A frame edge portion 92B extends from an outer periphery of the mount plate 92 to be curved toward the seat frame 90. The frame edge portion 92B includes a hole 94 in an obliquely lower rear section thereof. The seat-side wire harness 95 is inserted through the hole 94.

Figure 7:
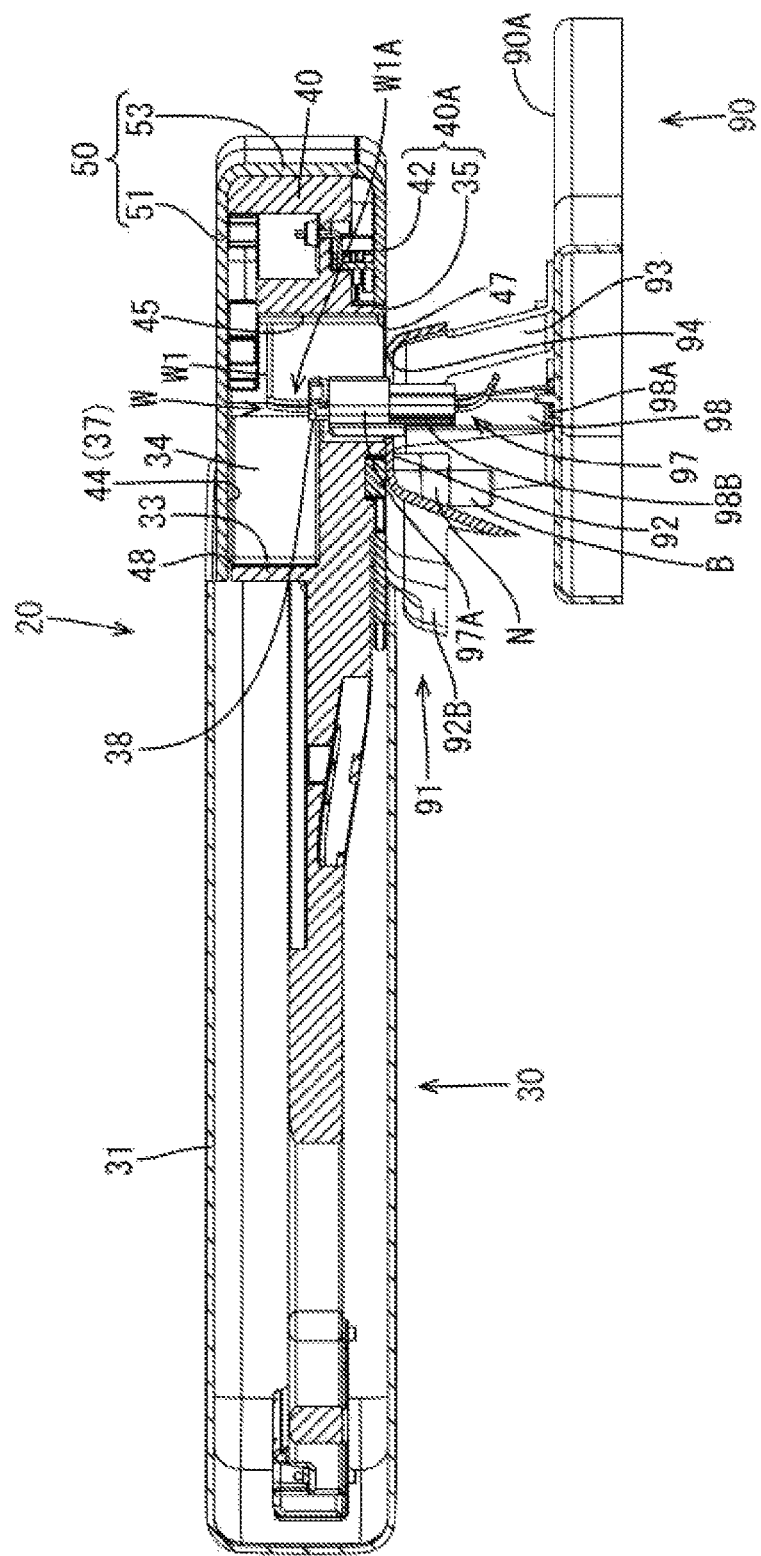
FIG. 7 is a cross-sectional view taken along B-B line in FIG. 3.
Figure 8:
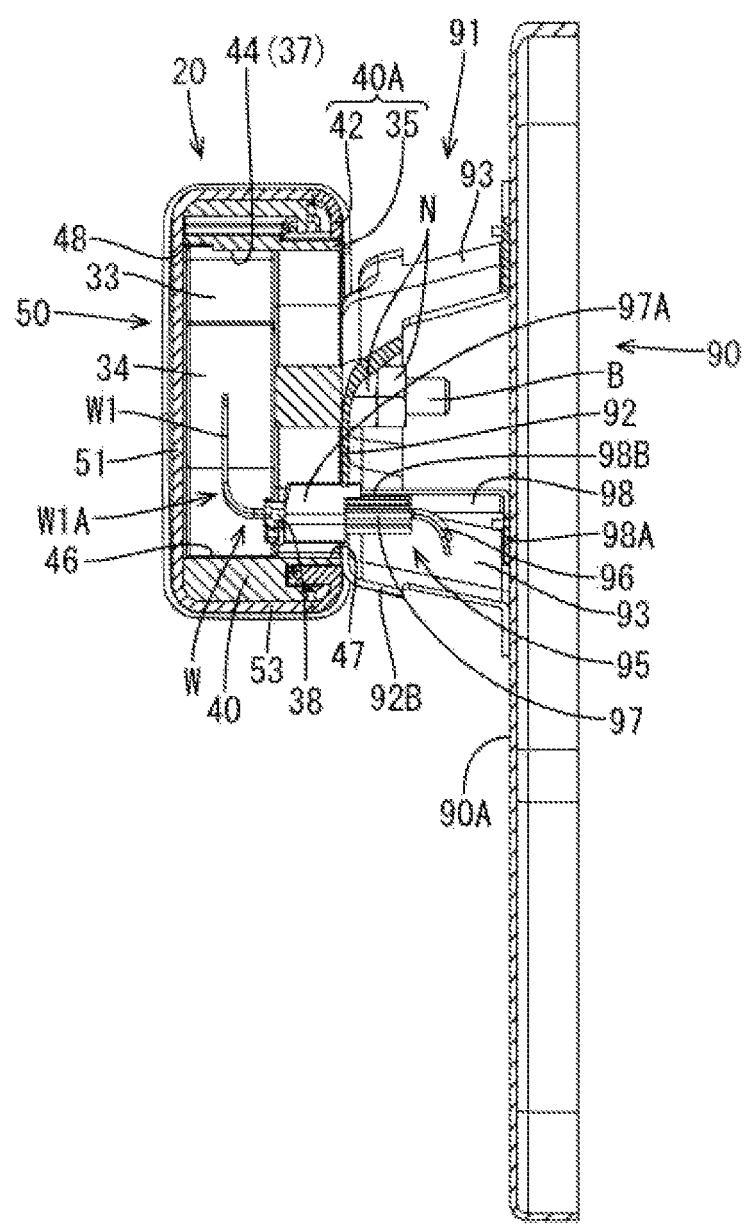
FIG. 8 is a cross-sectional view taken along C-C line in FIG. 4.

The seat-side wire harness 95 includes an electric wire 96 extending from the inside of the seat 80 and a seat-side connector (one example of a mount member-side connector) 97 that includes a hood 97A. The hood 97A is at an end of the electric wire 96. As illustrated in FIGS. 7 and 8, the seat-side connector 97 that is supported by a holding piece 98 is inserted through the hole 94.

As illustrated in FIG. 16, the mount plate 92 includes the hole 94 having a quadrangular shape extending from the frame edge portion 92B toward the bolt insertion hole 92A and the hole 94 is through the frame edge portion 92B and the mount plate 92 in the thickness direction thereof.

As illustrated in FIGS. 7 and 8, the holding piece 98 is a metal plate piece and is disposed so as to extend from the outer surface 90A of the seat frame 90 toward the bracket 91. A seat frame 90 side end portion 98A of the holding piece 98 is bent along a surface of the seat frame 90 and fixed to the outer surface 90A of the seat frame 90 with a known method such as welding and screwing with a bolt.

The seat-side connector 97 is fixed to an extended end portion 98B of the holding piece 98 such that the seat-side connector 97 projects outward in a direction perpendicular to a plate surface of the mount plate 92 and the hood 97A opens leftward and outward. Namely, as illustrated in FIGS. 15 and 16, the seat-side connector 97 is fixed to the seat frame 90 such that the food 97A opens leftward and toward the armrest 20 and is inserted through the hole 94 and projects outward from the mount plate 92.

The fixing pieces 93 are spaced from each other in a peripheral direction of the frame edge portion 92B and each of the fixing pieces 93 extends from the frame edge portion 92B toward the outer surface 90A of the seat frame 90.

Extended ends of the respective fixing pieces 93 are bent along the outer surface 90A of the seat frame 90 and the bent portions are fixed to the seat frame 90 with a known method such as welding and screwing with bolts. In this embodiment, the three fixing pieces 93 are fixed to the seat frame 90 with welding to fix the bracket 91 to the seat frame 90.

Figure 2:
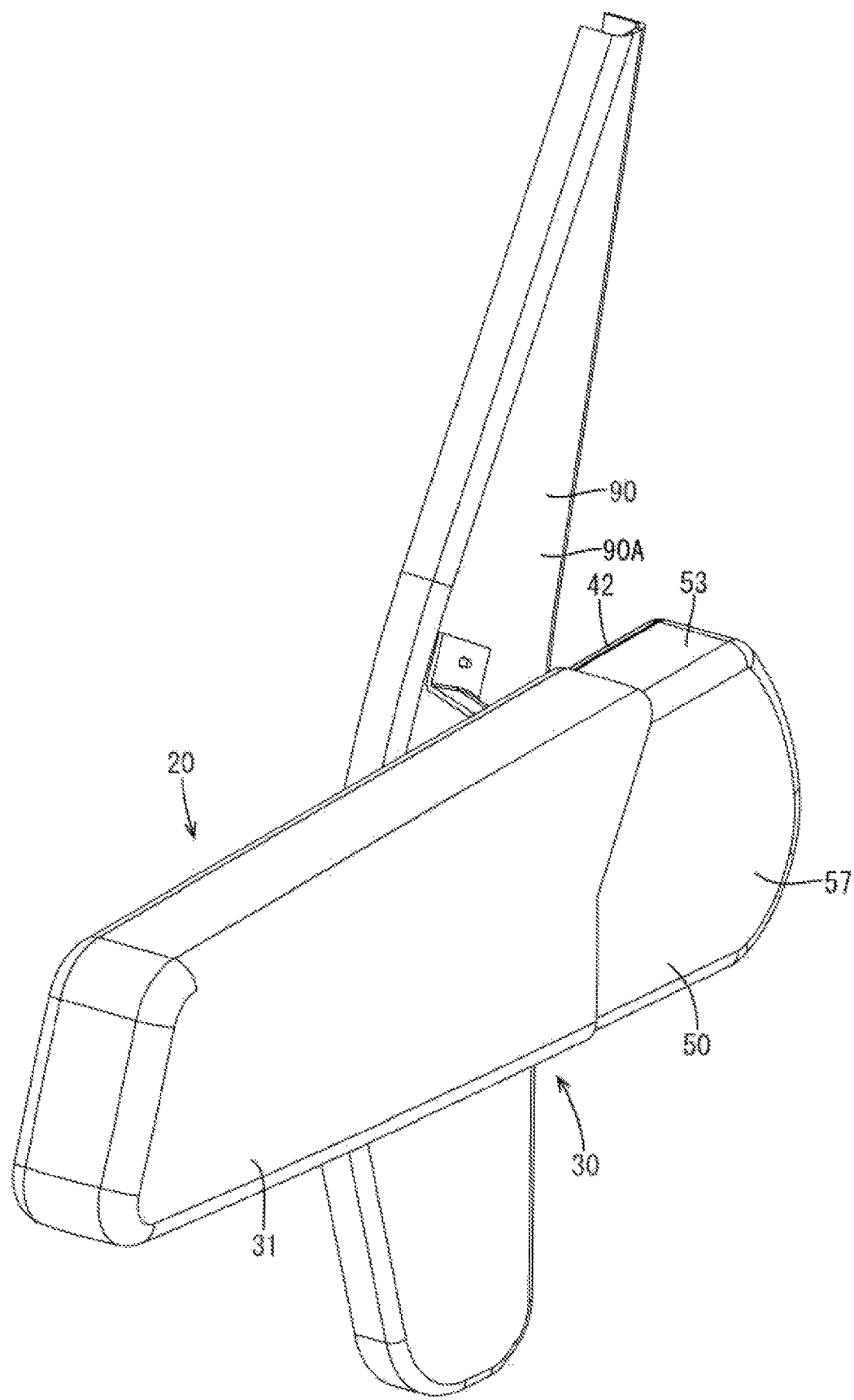
FIG. 2 is a perspective view illustrating the armrest that is fixed to a seat frame and in an arm support position.
Figure 3:
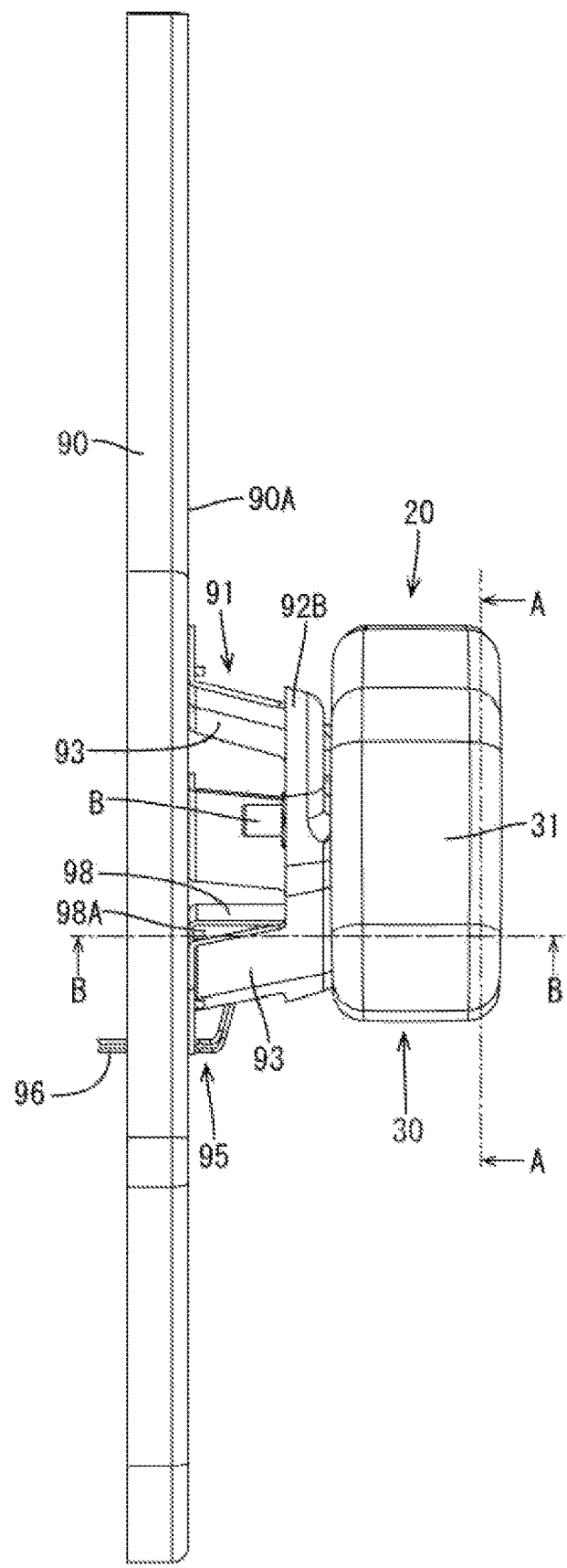
FIG. 3 is a front view illustrating the armrest that is fixed to the seat frame and in the arm support position.

As illustrated in FIGS. 1 and 2, the armrest 20 has a box shape that is elongated in the front-rear direction (one direction) and slightly thick in the right-left direction. The armrest 20 has a rear end section having a round shape so as to project rearward and a front end section that is tapered frontward. The armrest 20 is covered with a cover member such as fabric, leather or other material and the inside of the cover member may be filled with foaming resin. In this embodiment, the cover member and the foaming resin are not illustrated for easy understanding of the configuration of the armrest 20.

Figure 5:
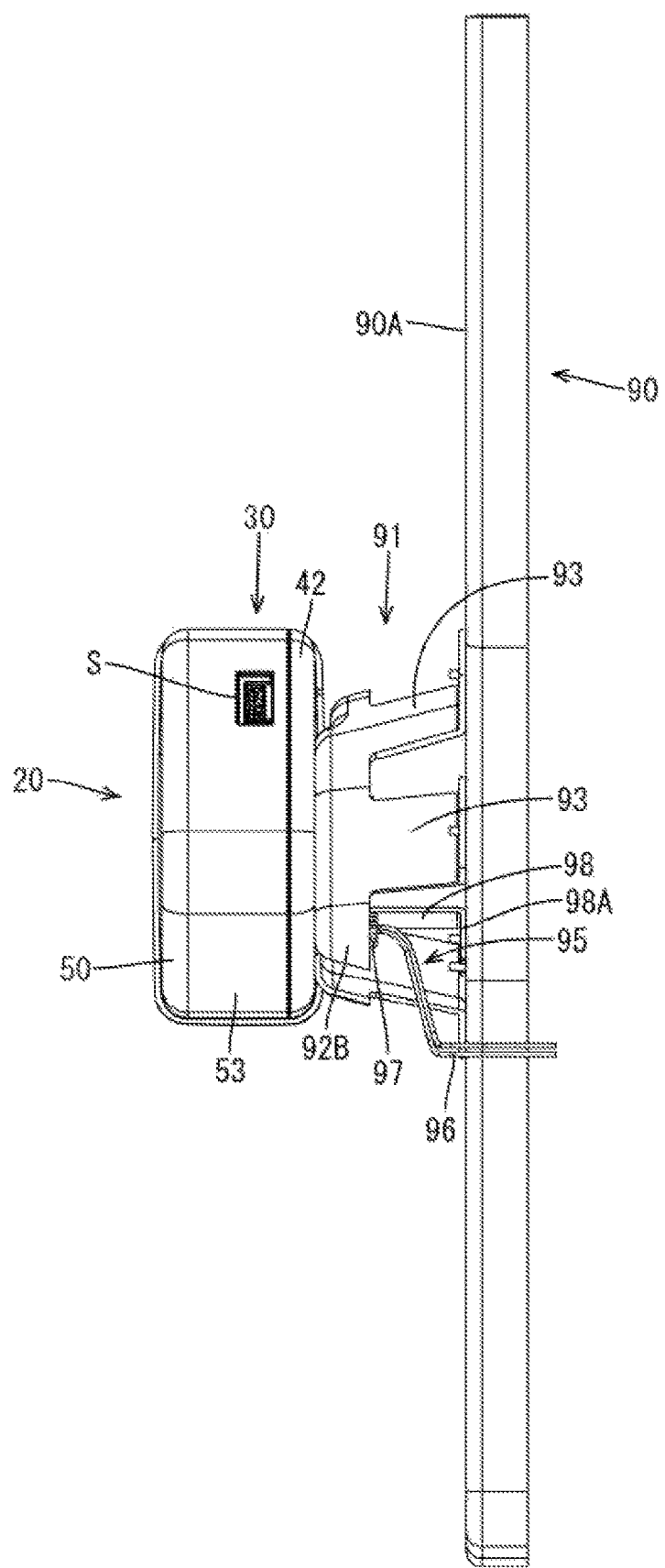
FIG. 5 is a rear view illustrating the armrest that is fixed to the seat frame and in the arm support position.

As illustrated in FIG. 5, the armrest 20 includes an electronic socket S in the rear end section thereof. The electronic socket S is a USB port in which a USB (universal serial bus) connector to be connected to a portable device is plugged. In this embodiment, the armrest 20 includes the electronic socket S only in the rear end section thereof but may also include an electronic socket in the front end section thereof.

As illustrated in FIG. 14, the armrest 20 includes an arm body member 30, a first cover 42, and a second cover 50. The arm body member 30 has a thickness in the right-left direction. The first cover 42 is attached to the arm body member 30 from the seat 80 side. The second cover 50 is attached to the arm body member 30 from an opposite side from the first cover.

Figure 6:
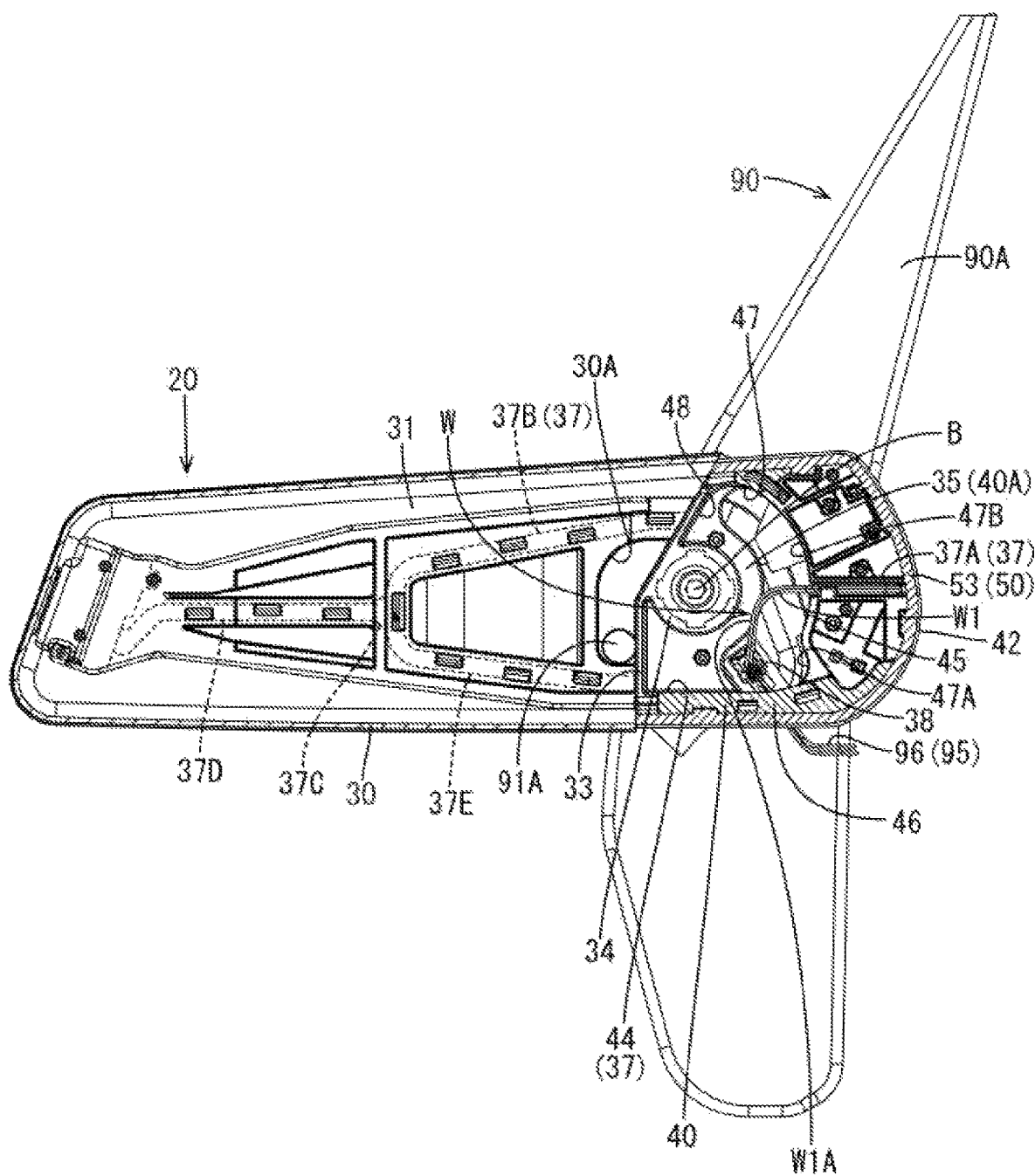
FIG. 6 is a cross-sectional view taken along A-A line in FIG. 3.

The arm body member 30 is made of synthetic resin. As illustrated in FIGS. 1, 2 and 6, the arm body member 30 is elongated in the front-rear direction and includes a first body section 31 on a front side with respect to a middle section thereof in the front-rear direction. The first body section 31 has a box shape that is tapered toward the front side and becomes thinner as it extends frontward.

Figure 12:
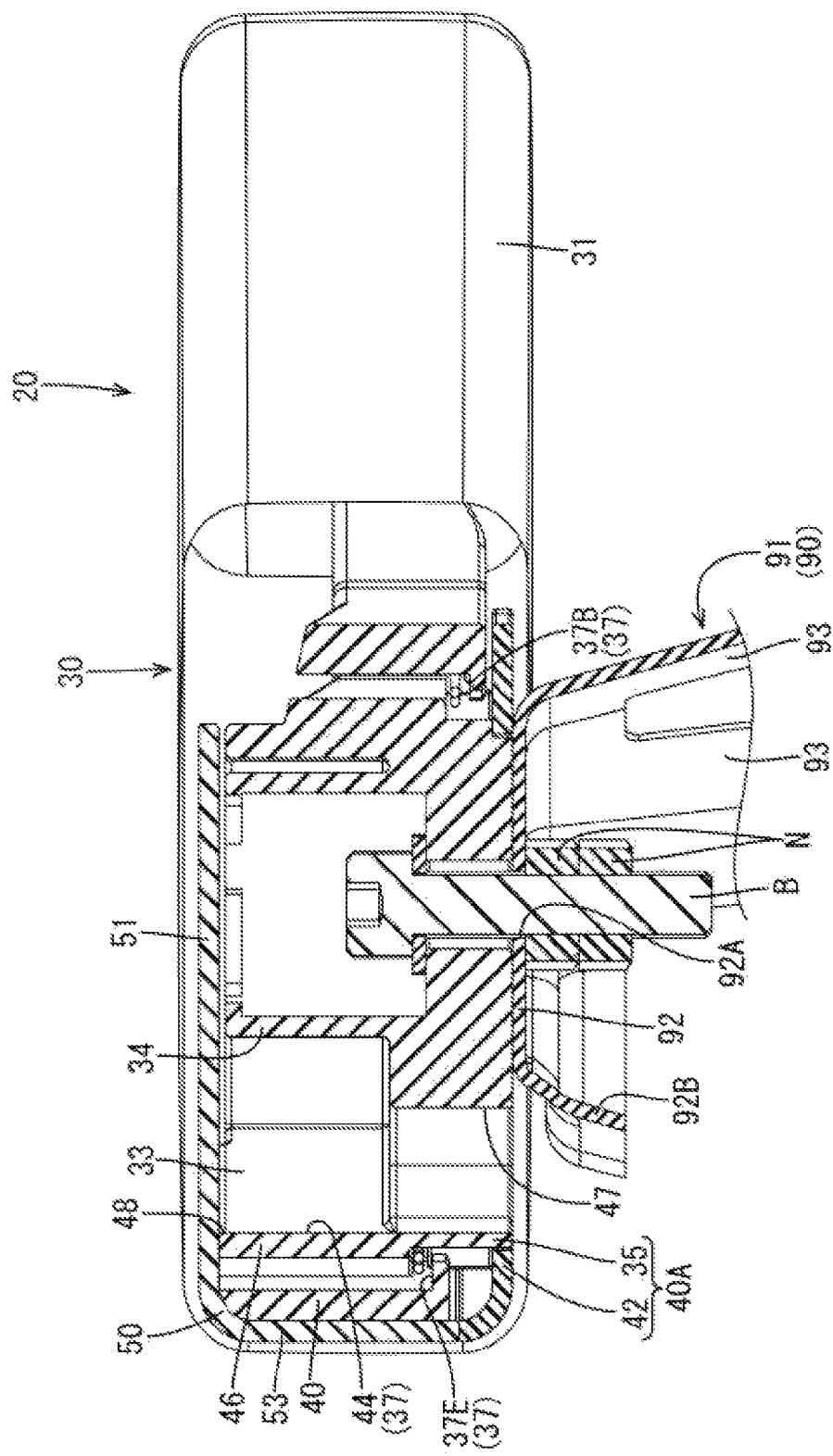
FIG. 12 is a cross-sectional view taken along E-E line in FIG. 10.
Figure 17:
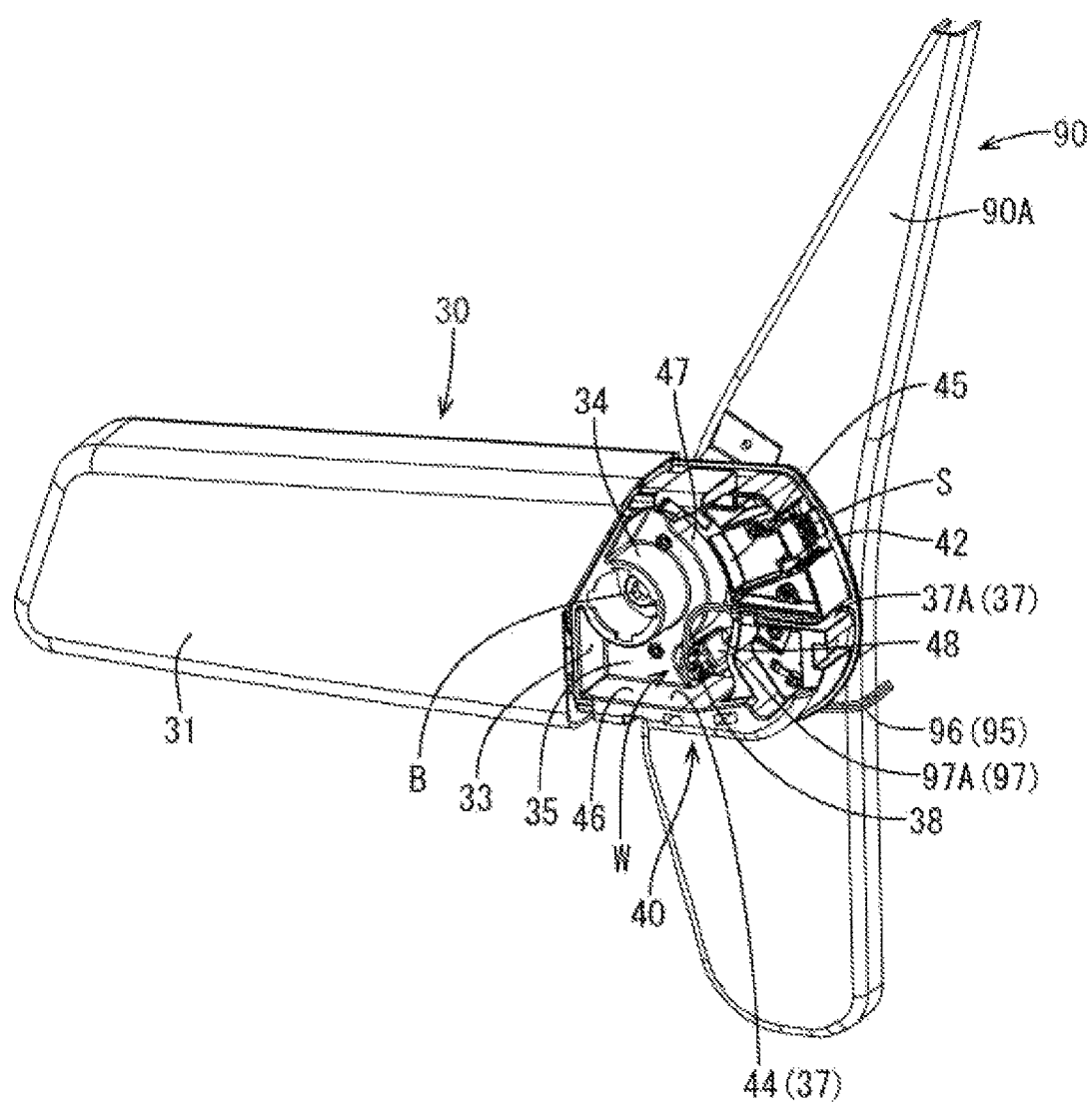
FIG. 17 is a perspective view illustrating the armrest from which an outer cover is detached.
Figure 18:
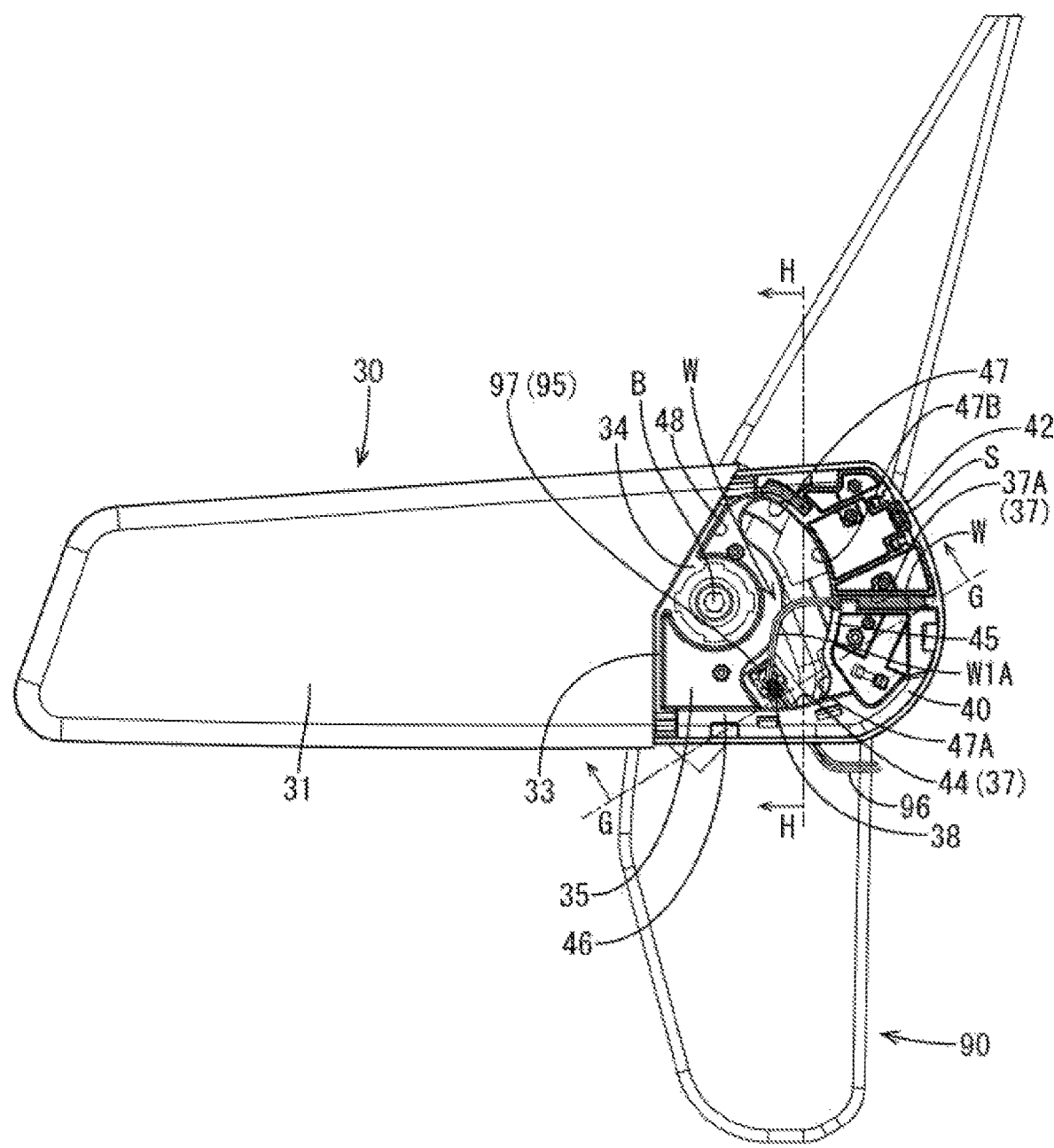
FIG. 18 is a side view illustrating the armrest from which the outer cover is detached.
Figure 19:
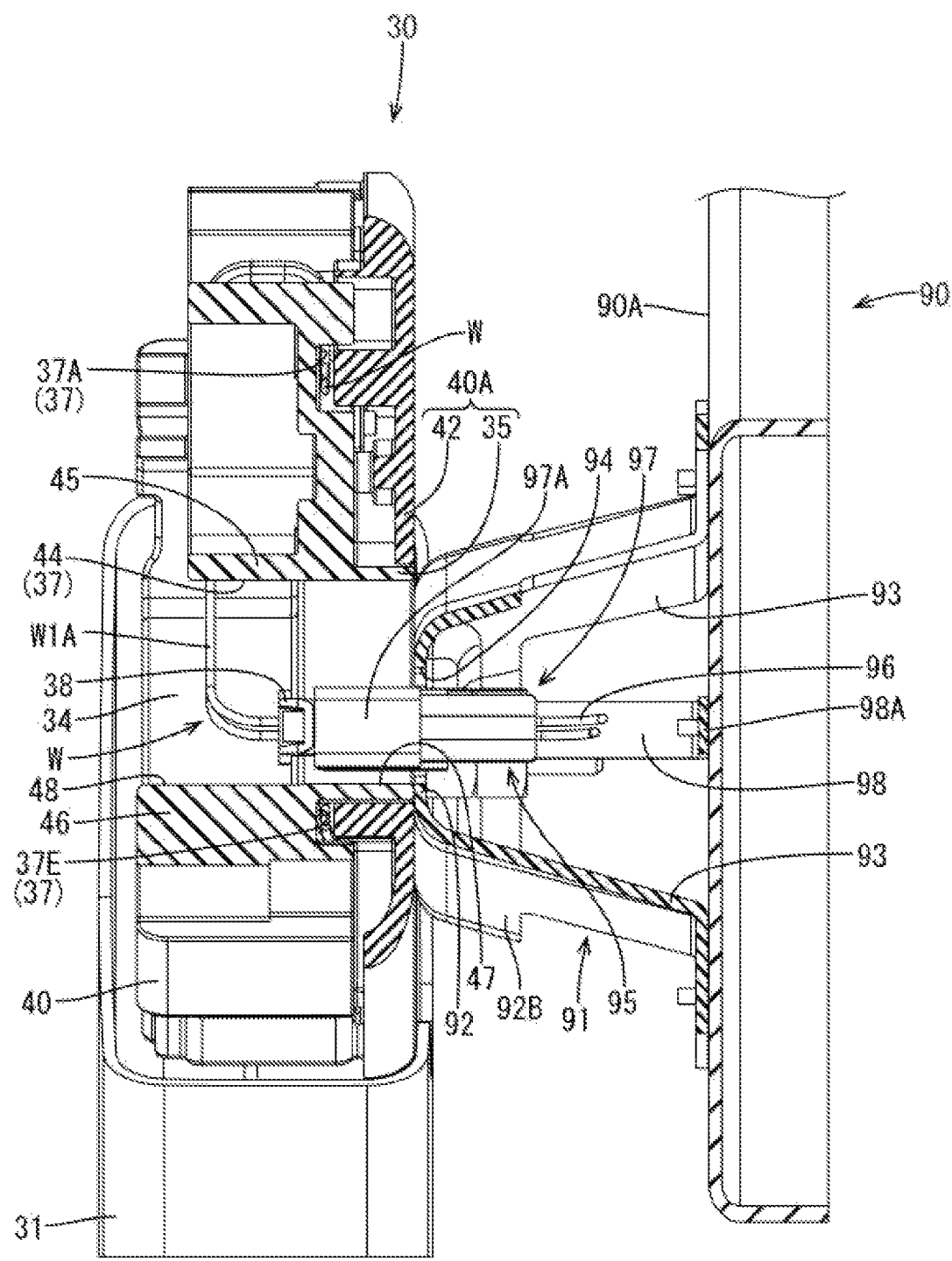
FIG. 19 is a cross-sectional view taken along G-G line in FIG. 18.
Figure 20:
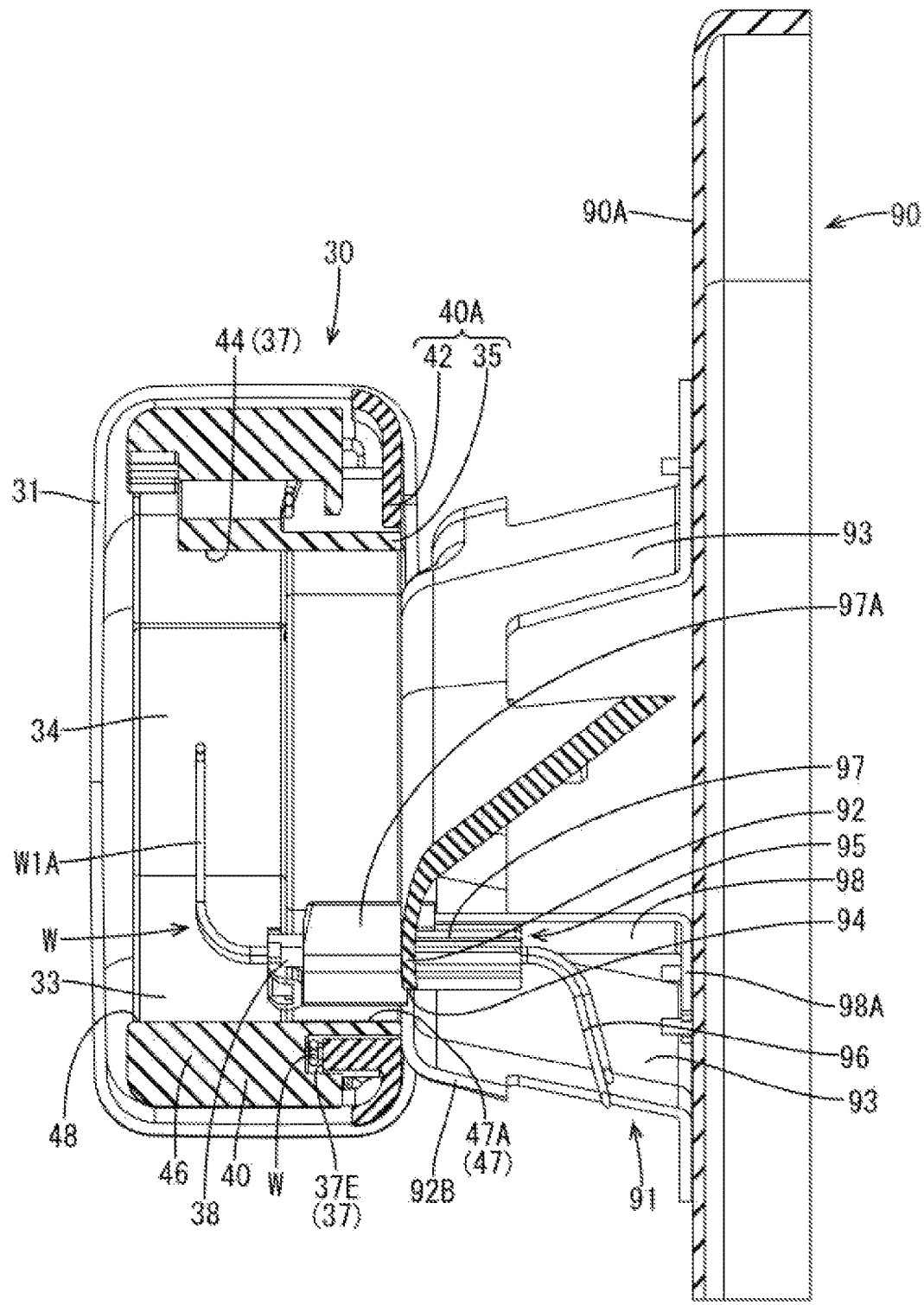
FIG. 20 is a cross-sectional view taken along H-H line in FIG. 18.

As illustrated in FIGS. 6, 17, and 18, the arm body member 30 includes a second body section 40 in a rear section thereof and the second body section 40 has a round shape projecting rearward. The arm body member 30 includes a separation wall 33 between the second body section 40 and the first body section 31. The second body section 40 includes a bolt receiving section 34 continuously from the separation wall 33. A support bolt (one example of a rotation axis) B can be put in the bolt receiving section 34. The bolt receiving section 34 has a circular outline shape with a side view and as illustrated in FIG. 12, the bolt receiving section 34 is recessed inwardly toward the right side. The support bolt B that is put in the bolt receiving section 34 is inserted through the bolt insertion hole 92A in the bracket 91 of the seat frame 90 and screwed into two nuts N in the seat frame 90. The support bolt B is screwed into the two nuts N and the arm body member 30 is fixed to the bracket 91.

Figure 9:
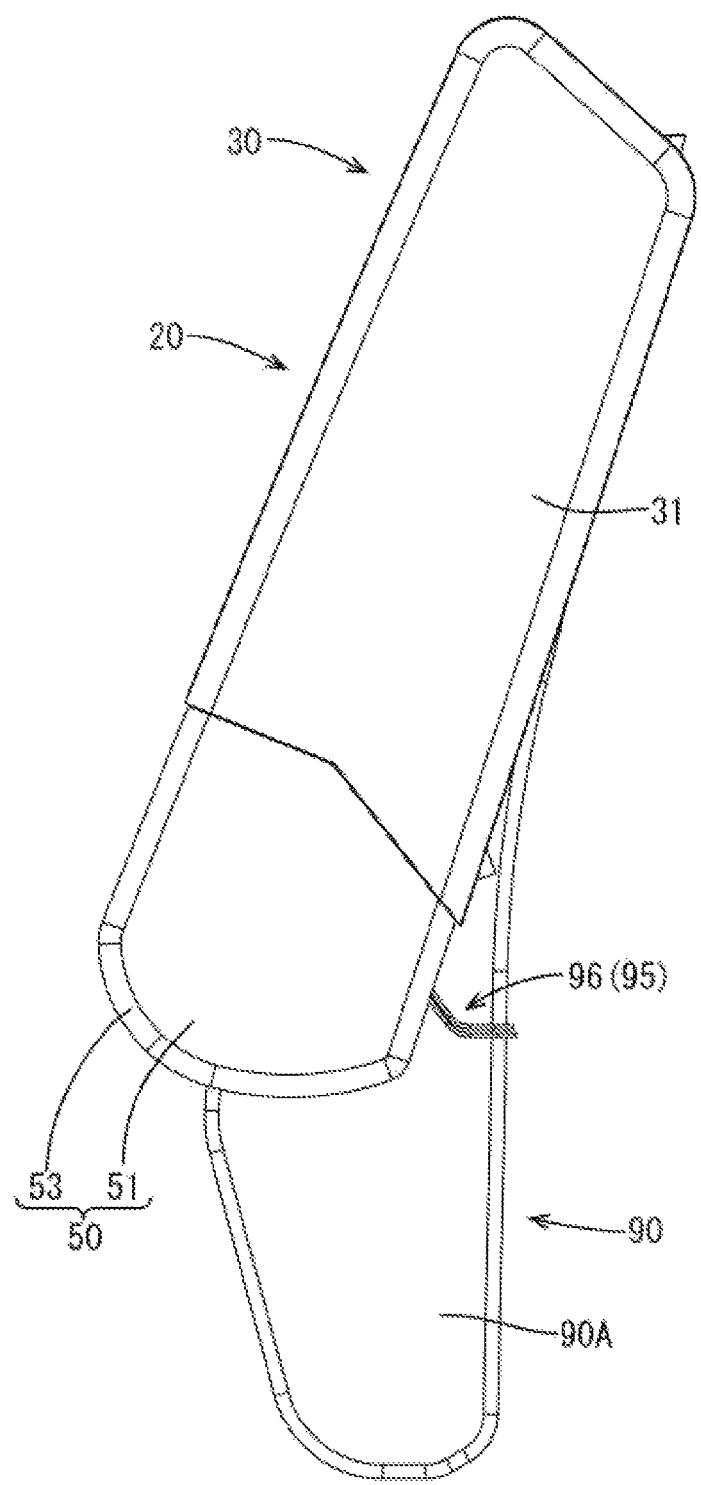
FIG. 9 is a side view illustrating the armrest that is fixed to the seat frame and in a lift-up position.
Figure 10:
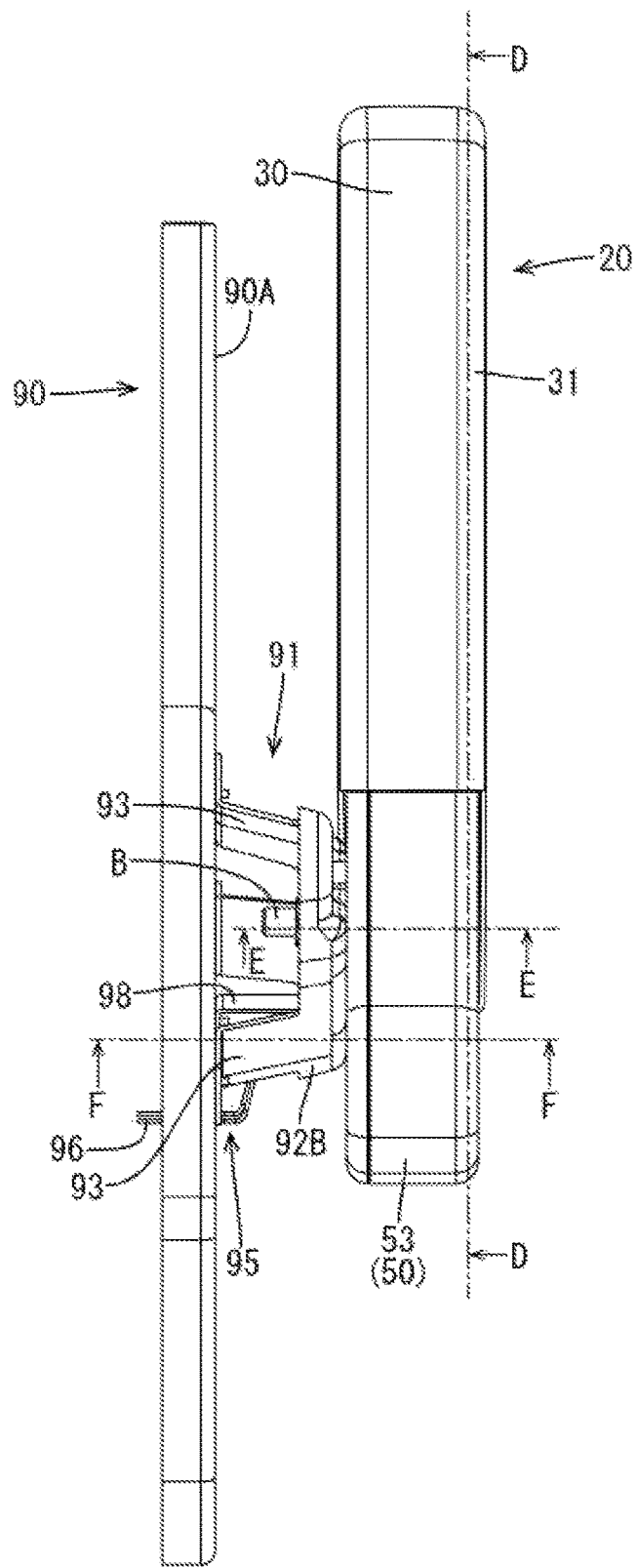
FIG. 10 is a front view illustrating the armrest that is fixed to the seat frame and in the lift-up position.
Figure 11:
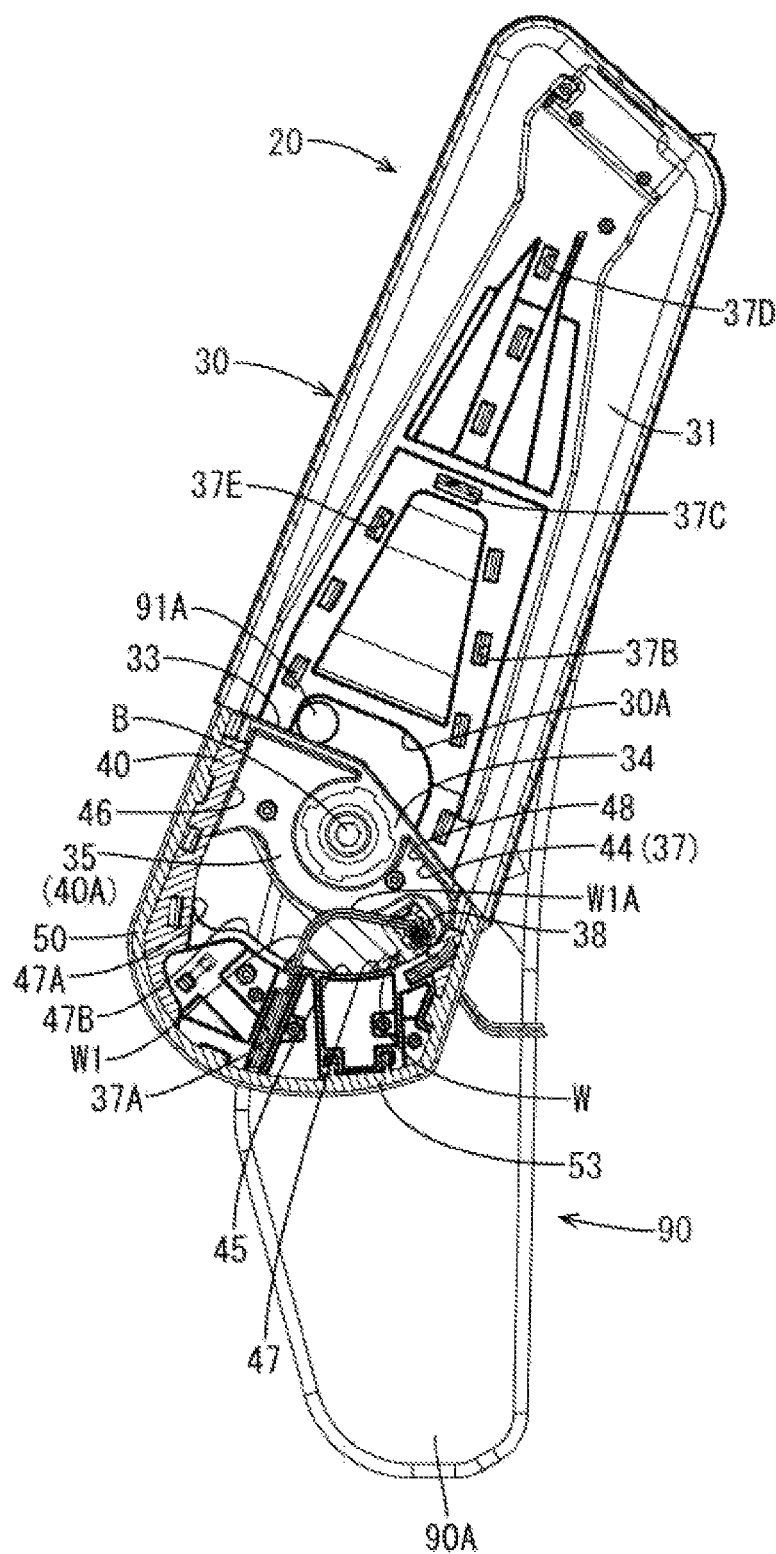
FIG. 11 is a cross-sectional view taken along D-D line in FIG. 10.

The arm body member 30 is pivotable around the support bolt B with respect to the bracket 91. The guide pin 91A of the bracket 91 is movable within a hole range of a guide hole 30A of the arm body member 30 such that the arm body member 30 is pivotably moved between an arm support position and a lift-up position. In the arm support position, the arm body member 30 is about in a horizontal state as illustrated in FIGS. 1 and 6. In the lift-up position, the arm body member 30 is disposed along the seat frame 90 as illustrated in FIGS. 9 and 11. Namely, the arm body member 30 is set in the arm support position when using the armrest 20 and the arm body member 30 is set in the lift-up position when the armrest 20 is not used.

Figure 13:
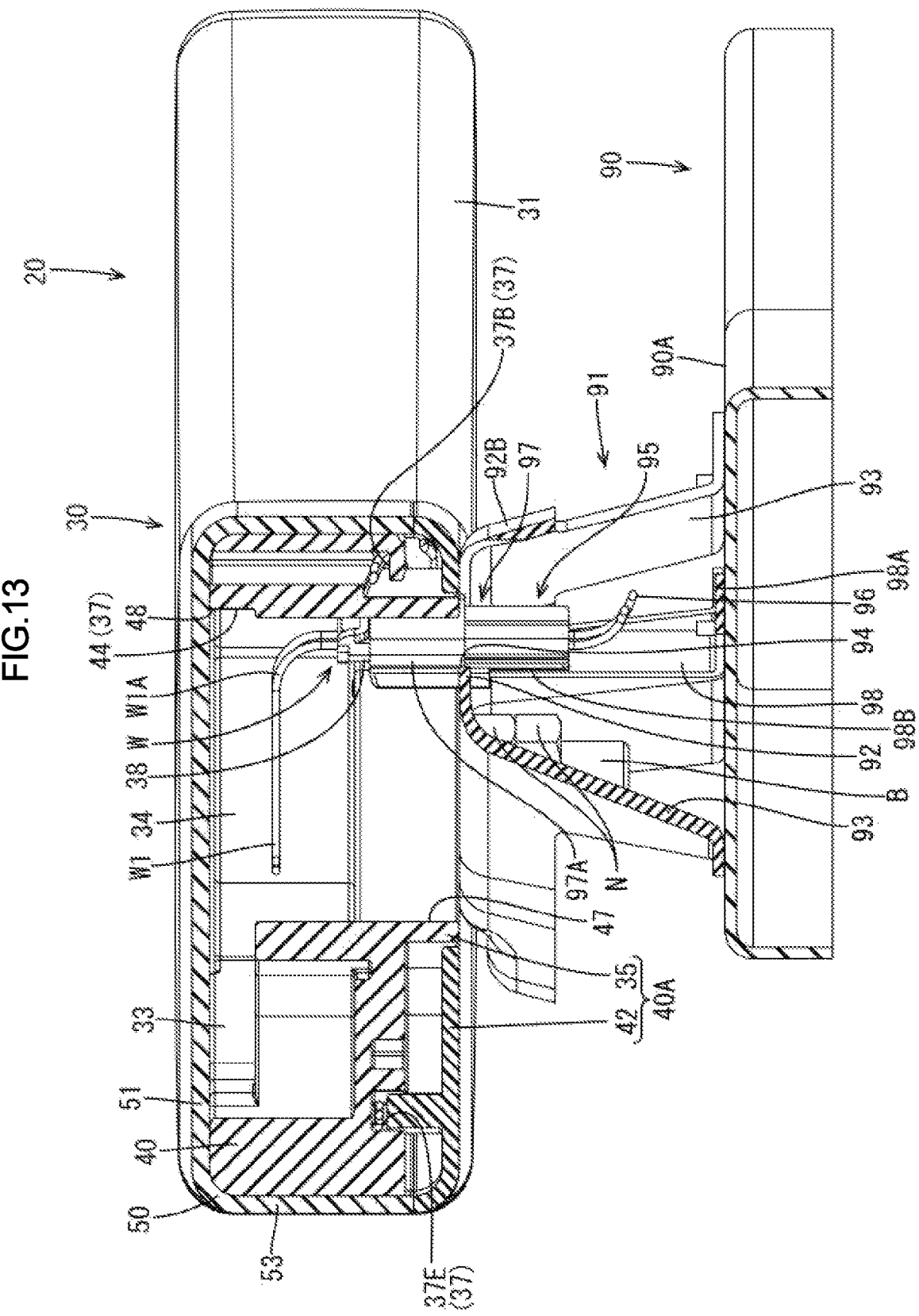
FIG. 13 is a cross-sectional view taken along F-F line in FIG. 10.

As illustrated in FIGS. 8, 12, and 13, the second body section 40 includes a seat-side wall (one example of a mount member-side wall) 40A that is opposite the seat frame 90. The seat-side wall 40A integrally includes a side wall 35, which is continuous from the right end portion of the bolt receiving section 34, and the first cover 42, which is attached to the second body section 40.

As illustrated in FIG. 14, the first cover 42 has a plate shape having a small thickness in the right-left direction. The first cover 42 is fixed to the second body section 40 by screwing small nuts, which are not illustrated and put in the second body section 40 from the left side, and screws, which are not illustrated and inserted from the right side. Thus, the seat-side wall 40A is defined by fixing the first cover 42 to the second body section 40 and covers the second body section 40 from the right side.

As illustrated in FIGS. 8, 12, and 13, the seat-side wall 40A is opposite and contacted with the mount plate of the bracket with surface contact in the right-left direction when the arm body member 30 is fixed to the bracket 91.

The second cover 50 is attached to the second body section 40 from the left side that is an opposite side from the seat frame 90.

As illustrated in FIGS. 7, 8, 12, and 13, the second cover 50 includes a cover body 51 and a peripheral wall 53. The cover body 51 is on the left side with respect to the second body section 40. The peripheral wall 53 extends from a peripheral edge of the cover body 51 except for a first body section 31 side peripheral edge.

Figure 4:
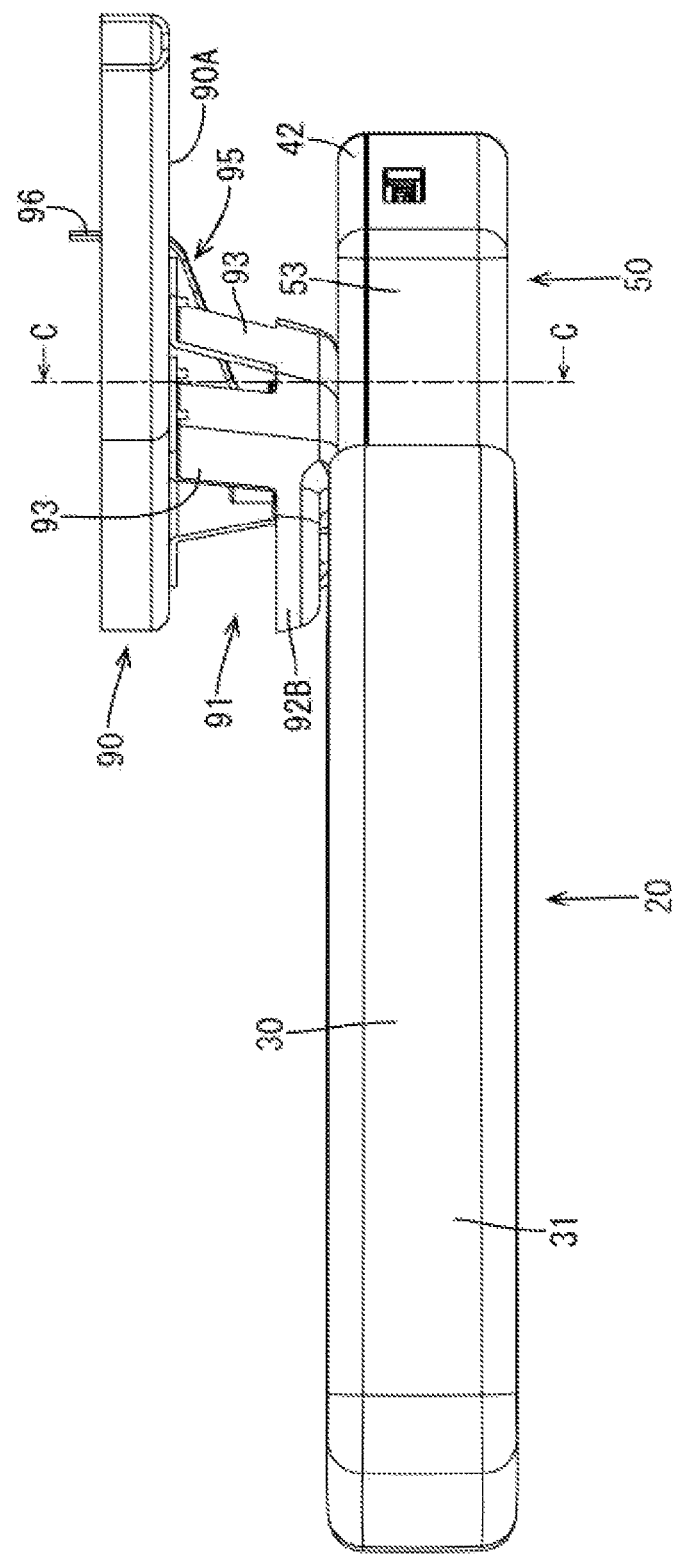
FIG. 4 is a plan view illustrating the armrest that is fixed to the seat frame and in the arm support position.
Figure 21:
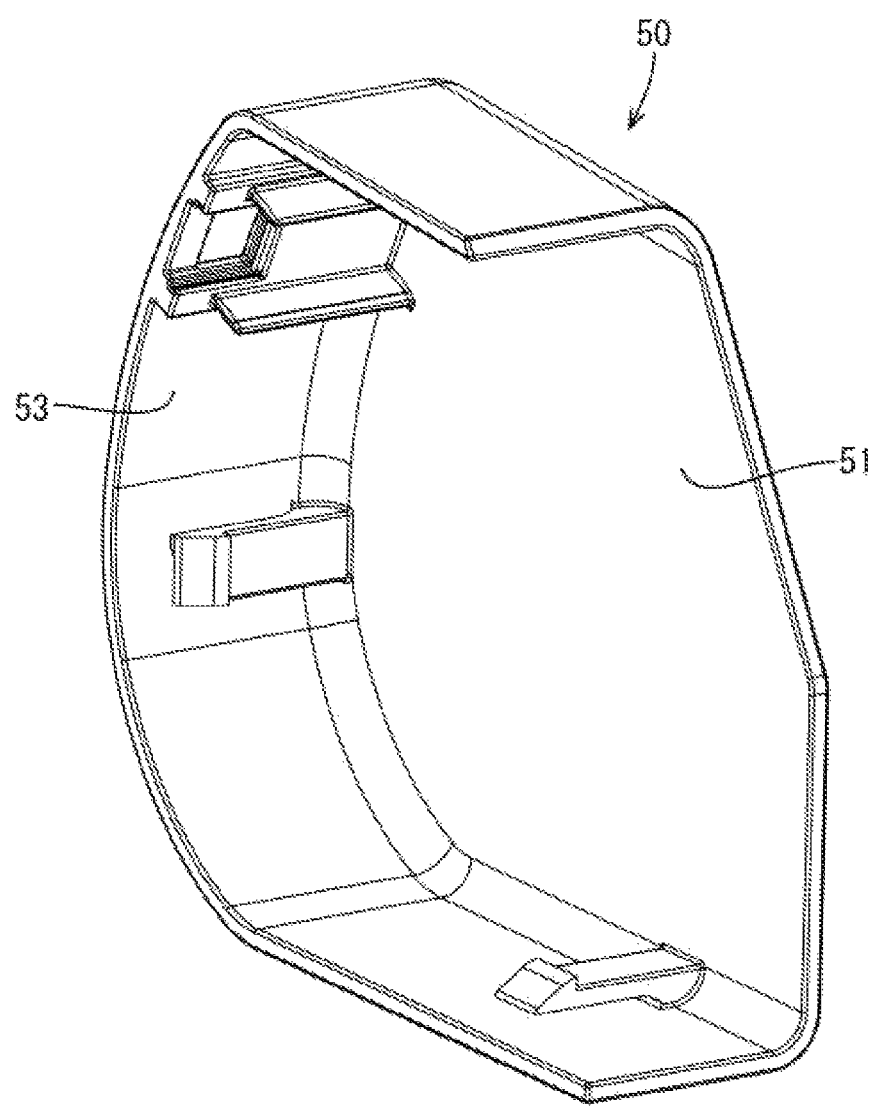
FIG. 21 is a perspective view of a second cover.

As illustrated in FIGS. 4 and 21, the cover body 51 is a flat plate and the peripheral wall 53 extends along an outer shape of the second body section 40.

As illustrated in FIGS. 7, 8, 12, and 13, the second cover 50 that is fixed to the second body section 40 is configured as an outer wall of the second body section 40 that is different from the wall opposite the seat frame 90 and completely covers the second body section 40 from a direction different from the first body section 31 side and the seat frame 90 side.

As illustrated in FIG. 6, the arm body member 30 includes an electric wire routing cavity 37 for routing the arm-side wire harness W from the second body section 40 toward the first body section 31.

As illustrated in FIGS. 6 to 8, the arm-side wire harness W includes an arm-side connector 38 that is to be connected to a seat-side connector 97 and electric wires W1 that are connected to the arm-side connector 38 and the electronic socket S.

As illustrated in FIGS. 8, 12, and 13, the arm-side connector 38 can be fitted in the hood 97A of the seat-side connector 97. When the arm-side connector 38 is fitted in the hood 97A of the seat-side connector 97, power is supplied via the seat-side wire harness 95 to the arm-side wire harness W and the electronic socket S is supplied with power.

As illustrated in FIG. 6, the electric wire routing cavity 37 extends in areas of the first body section 31 and the second body section 40.

The electric wire routing cavity 37 includes an arrangement section 44 in the second body section 40. The arm-side connector 38 and an end portion W1A of the electric wire W1 that is to be connected to the arm-side connector 38 are arranged in the arrangement section 44.

The second body section 40 includes the arrangement section 44 in a front section thereof. The arrangement section 44 has a space that is defined by the side wall 35 and a wall including an extending wall 45 extending leftward from the side wall 35, the separation wall 33, the bolt receiving section 34, and a bottom wall 46 that are continuous from each other in the peripheral direction.

As illustrated in FIG. 6, the electric wire routing cavity 37 includes a first routing section 37A, a second routing section 37B, a branch section 37C, a third routing section 37D, and a fourth routing section 37E. The first routing section 37A extends from the arrangement section 44 to a rear end portion of the second body section 40 and the electric wire W1 is routed therein. The second routing section 37B extends from a rear end of the first routing section 37A to a middle portion of the first body section 31 along an upper outline of the arm body member 30 with respect to the front-rear direction and the electric wire W1 is routed therein. The branch section 37C is in the middle portion of the first body section 31 with respect to the front-rear direction. The third routing section 37D extends from the branch section 37C to a front end portion of the first body section 31 and the electric wire W1 is routed therein. The fourth routing section 37E extends from the branch section 37C to a rear end portion of the second body section 40 along a lower edge section of the first body section 31 and the electric wire W1 is routed therein. The electric wire W1 extending through the fourth routing section 37E to the rear end portion of the second body section 40 is connected to the electronic socket S attached to the rear end portion of the arm body member 30.

As illustrated in FIGS. 6 to 8, and 11 to 13, the seat-side wall 40A of the second body section 40 of the arm body member 30 includes a connector insertion hole 47 therethrough in the right-left direction. The arm-side connector 38 connected to the arm-side wire harness W can be inserted through the connector insertion hole 47. The second body section 40 includes an operation hole 48 at a left end of the arrangement section 44 of the electric wire routing cavity 37. The operation hole 48 is open toward an opposite direction from the seat frame 90 side (leftward).

The side wall 35 of the seat-side wall 40A includes the connector insertion hole 47. The connector insertion hole 47 is on a rear side of the bolt receiving section 34 and has an arched shape extending around the support bolt B to be continuous from the arrangement section 44 of the electric wire routing cavity 37.

The connector insertion hole 47 has a width dimension with respect to a radial direction and the width dimension is greater than an outline dimension of the hood 97A of the seat-side connector 97. The connector insertion hole 47 includes a wide portion 47A at a lower end section thereof and the wide portion 47A has an arched shape that is greater in the radial direction than other section of the connector insertion hole 47.

When the arm body member 30 is fixed to the bracket 91 of the seat frame 90, the hood 97A of the seat-side connector 97 that projects outward from the mount plate 92 of the bracket 91 is inserted through the connector insertion hole 47 and the hood 97A of the seat-side connector 97 is put into the arrangement section 44.

Figure 22:
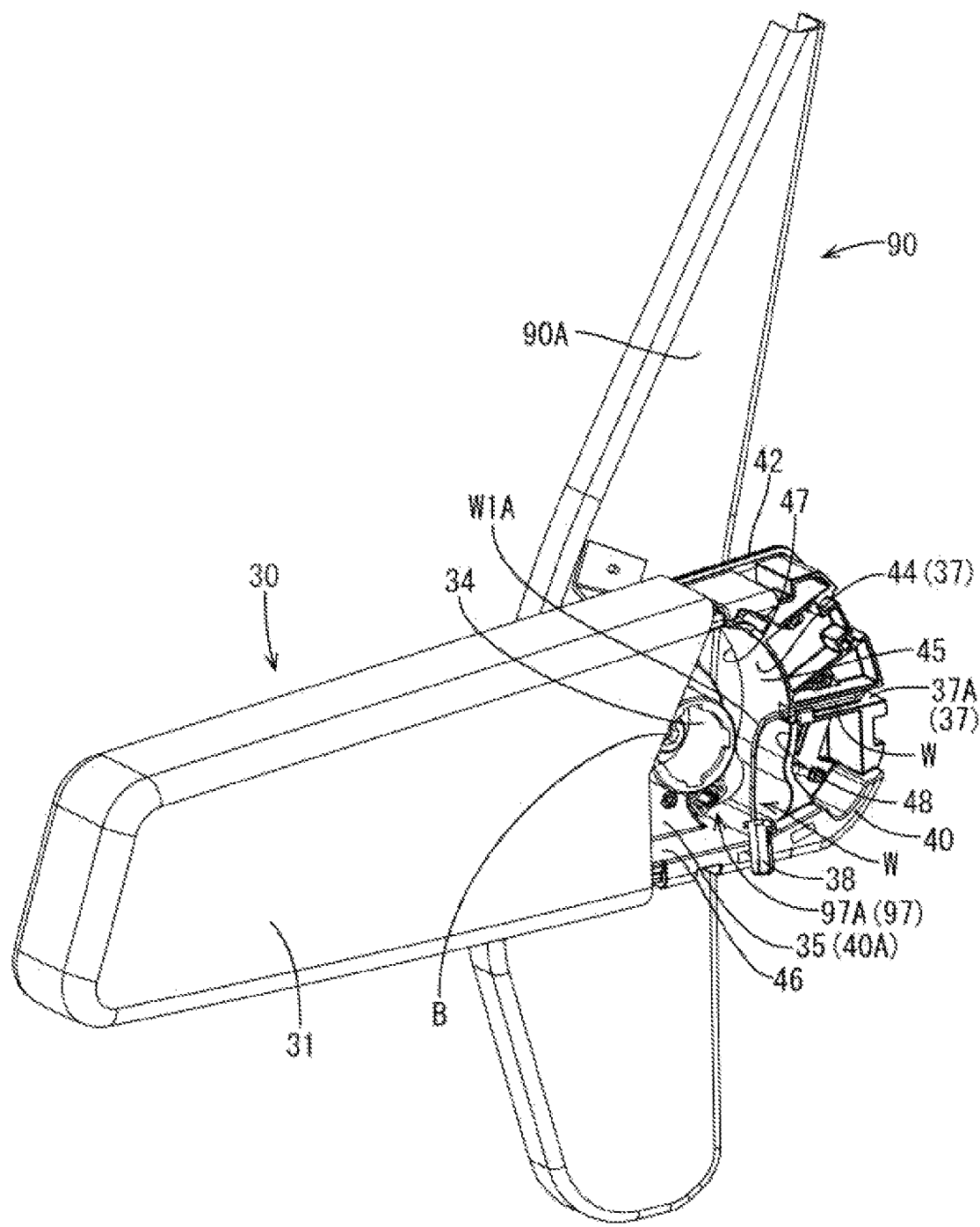
FIG. 22 is a perspective view illustrating a seat-side connector and an arm-side connector that are not coupled.
Figure 23:
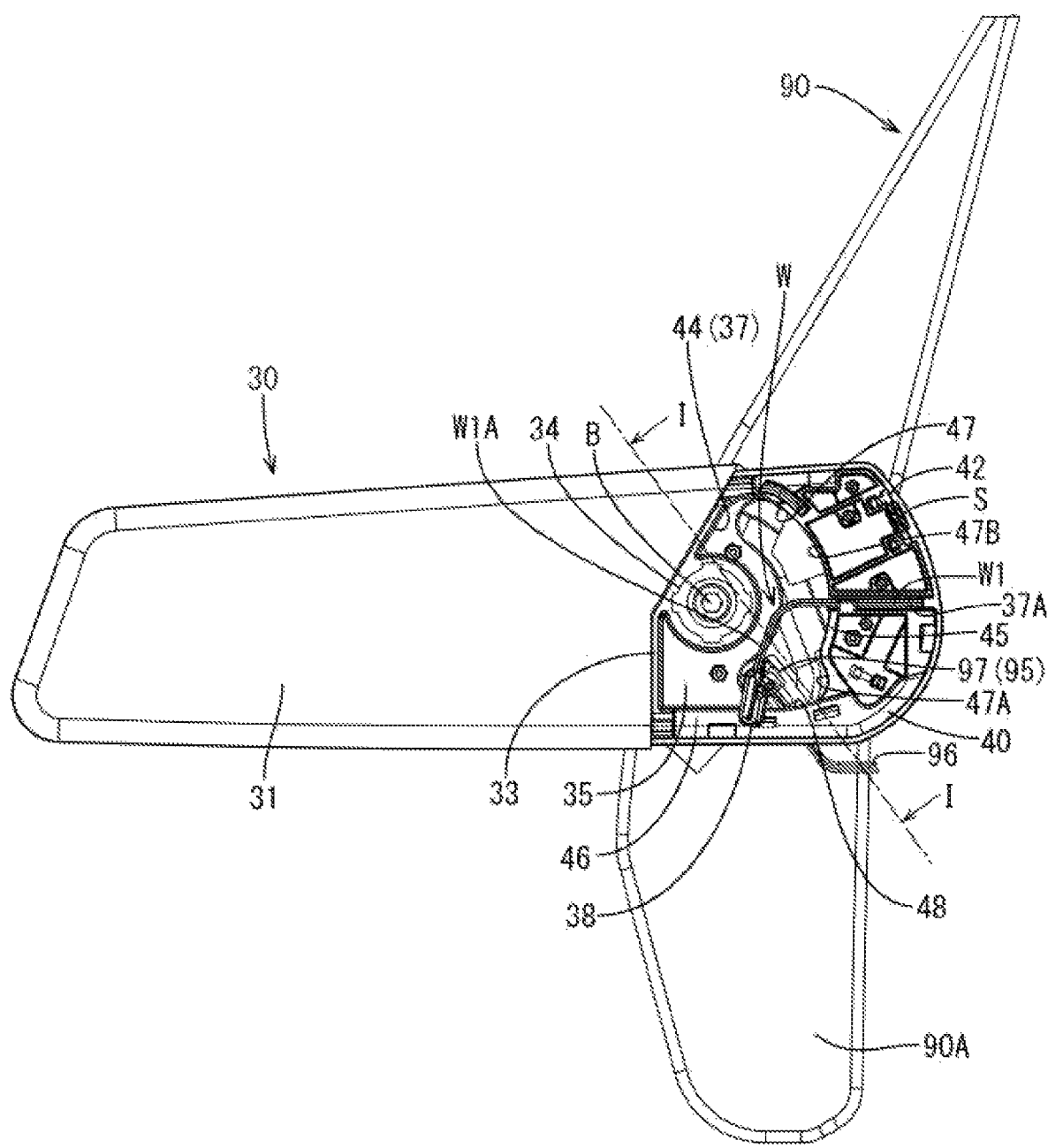
FIG. 23 is a side view illustrating the seat-side connector and the arm-side connector that are not coupled.
Figure 24:
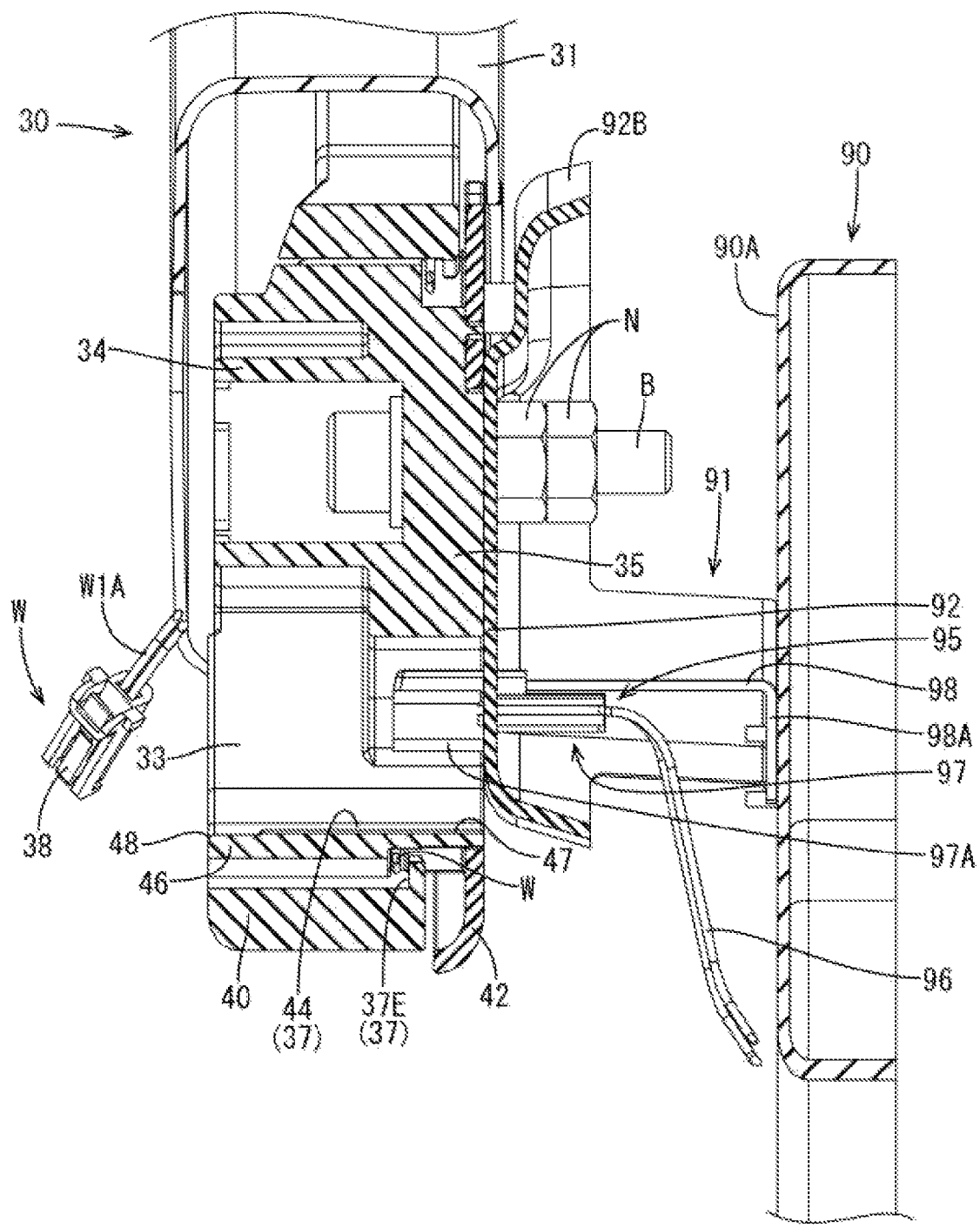
FIG. 24 is a cross-sectional view taken along I-I line in FIG. 23.

Namely, after the arm body member 30 is fixed to the bracket 91 of the seat frame 90 to put the hood 97A into the arrangement section 44 through the connector insertion hole 47, as illustrated in FIGS. 22 to 24, the hood 97A of the seat-side connector 97 faces leftward within the arrangement section 44. Then, the arm-side connector 38 is fitted in the hood 97A that is within the arrangement section 44. Accordingly, as illustrated in FIGS. 8, 12, and 13, the arm-side connector 38 that is fitted in the hood 97A of the seat-side connector 97 is inserted in the connector insertion hole 47.

The arm body member 30 is pivotably moved between the arm support position and the lift-up position while the arm-side connector being inserted in the connector insertion hole 47. As illustrated in FIG. 6, when the arm body member 30 is in the arm support position, the arm-side connector 38 is arranged in the wide portion 47A in the lower end section of the connector insertion hole 47. As illustrated in FIG. 11, when the arm body member 30 is in the lift-up position, the arm-side connector 38 is arranged in an upper end section of the connector insertion hole 47.

As illustrated in FIGS. 6 to 8, and 11 to 13, the operation hole 48 is larger than the connector insertion hole 47. The operation hole 48 is continuous from the connector insertion hole 47 through the arrangement section 44. As illustrated in FIGS. 6 and 11, the connector insertion hole 47 can be completely seen from the left side through the operation hole 48.

With such a configuration, an operator can couple the arm-side connector 38 to the seat-side connector 97 easily through the operation hole 48.

The second cover 50 is attached to the second body section 40 after the support bolt B is fitted in the bolt receiving section 34 to fix the arm body member 30 to the bracket 91 of the seat frame 90 and the arm-side connector 38 and the seat-side connector 97 are coupled together. Accordingly, as illustrated in FIGS. 7, 8, 12, and 13, the operation hole 48 is covered with the cover body 51 from the left side.

The operation hole 48 of the arrangement section 44 is covered with the cover body 51 of the second cover 50. As illustrated in FIGS. 6 and 11, the extending wall 45 of the arrangement section 44 has an arched side-view shape that is along a rear-side hole edge 47B of the connector insertion hole 47 according to the arched shape of the connector insertion hole 47. Therefore, the inner space of the arrangement section 44 is larger than other sections of the electric wire routing cavity 37 in the front-rear direction and the vertical direction. With such a configuration, as illustrated in FIGS. 6 and 11, not only the electric wire W1 to be arranged in the arrangement section 44 but also an extra portion of the electric wire W1 can be arranged in the arrangement section 44.

This embodiment includes the above-described configuration and one example of steps of mounting the armrest 20 on the seat 80 will be simply described and operations and advantageous effects thereof will be described next.

The arm body member 30 in which the arm-side wire harness W is previously arranged is prepared and the arm body member 30 is fixed to the seat 80.

The arm body member 30 is fixed to the seat 80 such that the hood 97A of the seat-side connector 97 is inserted in the connector insertion hole 47 of the seat-side wall 40A of the arm body member 30 and the seat-side wall 40A is contacted with the mount plate 92 of the bracket 91 from the left side. Then, as illustrated in FIGS. 22 to 24, the hood 97A of the seat-side connector 97 is inserted through the connector insertion hole 47 into the arrangement section 44 and the arm body member 30 is disposed on the left side of the mount plate 92 of the bracket 91. In the fixing of the arm body member 30, the guide pin 91A is inserted in the guide hole of the arm body member 30.

Next, the support bolt B is fitted in the bolt receiving section 34 of the second body section 40 of the arm body member 30 from the left side and the support bolt B that is fitted in the bolt receiving section 34 is inserted through the bolt insertion hole 92A of the bracket 91 to be screwed to the two nuts N that are arranged on the seat frame 90 side. Accordingly, as illustrated in FIGS. 22 to 24, the arm body member 30 is fixed to the bracket 91 to be pivotably moved between the arm support position and the lift-up position.

Next, the arm-side connector 38 of the arm-side wire harness W is fitted in the hood 97A of the seat-side connector 97 that is within the arrangement section 44.

Since the connector insertion hole 47 can be completely seen through the operation hole 48, the hood 97A of the seat-side connector 97 is inserted through the connector insertion hole 47 into the arrangement section 44 and open toward the left side. With such a configuration, the arm-side connector 38 and the seat-side connector 97 can be coupled together easily through the operation hole 48.

In the coupling of the seat-side connector 97 and the arm-side connector 38, the arm-side connector 38 is coupled to the seat-side connector 97 from the left side. In this operation, the electric wire W1 necessarily has a total length dimension including the length of the electric wire W1 arranged in the electric wire routing cavity 37 and a coupling stroke length that allows the arm-side connector 38 to move in the right-left direction.

However, after finishing the coupling of the seat-side connector 97 and the arm-side connector 38, a portion of the electric wire W1 corresponding to the coupling stroke length becomes an extra wire portion within the arm body member 30.

In this embodiment, as illustrated in FIGS. 6 and 11, the arrangement section 44 in which the end portion W1A of the electric wire W1 to be connected to the arm-side connector 38 is arranged has a size enough for storing the electric wire W1 to be arranged in the arrangement section 44 and also the extra wire portion of the electric wire W1. Therefore, the extra wire portion of the electric wire W1 corresponding to the coupling stroke length necessary for the coupling operation of the seat-side connector 97 and the arm-side connector 38 can be arranged in the arrangement section 44.

Namely, according to this embodiment, the extra wire portion of the electric wire W1 included in the arm-side wire harness W can be handled appropriately and easily. Therefore, the operability of mounting the armrest 20 on the seat 80 is further improved.

Furthermore, in this embodiment, when the arm body member 30 is in a middle position between the arm support position and the lift-up position, the distance between the arm-side connector 38 and the first routing section 37A is smallest and this causes the extra wire portion in the electric wire W1 of the arm-side wire harness W. The arrangement section 44 has a size enough for storing the extra wire portion of the electric wire W1 in addition to the electric wire W1 to be arranged in the arrangement section 44. With such a configuration, the arm body member 30 is less likely to be prevented from pivoting due to the extra wire portion of the electric wire W1 that is caused by the pivoting of the arm body member 30.

As described before, the armrest 20 of this embodiment includes the arm-side wire harness W and the arm body member 30. The arm-side wire harness W includes at least an electric wire W1 and the arm-side connector 38 that is connected to an end of the electric wire W1 and to be coupled to the seat-side connector (the mount member-side connector) 97 mounted on the seat (the mount member) 80. The arm body member 30 includes the electric wire routing cavity 37 in which the electric wire W1 of the arm-side wire harness W is arranged and the seat-side wall (the mount member-side wall) 40A that is opposite the seat frame 90 of the seat 80. The arm body member 30 is fixed to the seat frame 90 while the seat-side wall 40A being opposite the seat frame 90. As illustrated in FIGS. 6 and 11, the seat-side wall 40A includes the connector insertion hole 47 through which the arm-side connector 38 can be inserted and the arm body member 30 includes the operation hole 48 that is continuous from the connector insertion hole 47 via the arrangement section 44 of the electric wire routing cavity 37.

The seat-side connector 97 and the arm-side connector 38 can be coupled together through the operation hole 48 after the arm body member 30 is fixed to the seat frame 90 such that the seat-side wall 40A is opposite the seat frame 90. This improves the operability of mounting the armrest 20 on the seat 80.

As illustrated in FIGS. 7 and 8, since the second cover 50 that is for closing the operation hole 48 can be attached to and detached from the arm body member 30, the operation hole 48 can be closed after the seat-side connector and the arm-side connector 38 are coupled together. According to such a configuration, the arm-side wire harness W arranged within the arm body member 30 can be protected and the arm body member 30 is less likely to be reduced in strength compared to a configuration in which the operation hole is not closed.

According to this embodiment, the seat-side connector 97 and the arm-side connector 38 that are coupled together are inserted in the connector insertion hole 47 when the arm body member 30 is fixed to the seat frame 90. Therefore, the electric wire 96 of the seat-side wire harness 95 and the electric wire W1 of the arm-side wire harness W are less likely to be damaged by the hole edge of the connector insertion hole 47 when the arm body member 30 is pivoted or vibration occurs.

Each of the wire harnesses 95, W needs to have the extra wire portion in the electric wire W1 corresponding to the coupling stroke length to couple the seat-side connector 97 and the arm-side connector 38 together. However, an additional process is necessary for dealing with the electric wire W1 corresponding to the coupling stroke length as an extra wire portion after coupling the connectors 38, 97 together.

The electric wire W1 including the extra wire portion corresponding to the coupling stroke length for coupling the seat-side connector 97 and the arm-side connector 38 can be arranged in the arrangement section 44 of the electric wire routing cavity 37. With such a configuration, the extra wire portion of the electric wire W1 included in the arm-side wire harness W can be easily handled. This improves the operability of mounting the armrest 20 on the seat frame 90.

The seat with an armrest 10 according to this embodiment includes the armrest 20 and the seat 80. The seat-side connector 97 is fixed to the seat frame 90 so as to be in the connector insertion hole 47 when the arm body member 30 is fixed to the seat frame 90.

After the arm body member 30 is fixed to the seat frame 90 of the seat 80, the seat-side connector 97 faces the connector insertion hole 47. Therefore, the arm-side connector 38 can be easily coupled to the seat-side connector 97 and the coupling operation can be performed more easily through the operation hole 48. This further improves the operability of mounting the armrest 20 on the seat 80.

Further, in this embodiment, the arm body member 30 is pivotable around the support bolt (a rotation axis) B that extends from the seat frame 90 to the arm body member 30. The extra wire portion of the electric wire W1 included in the arm-side wire harness W that is caused by the pivoting of the arm body member 30 can be arranged within the arrangement section 44 of the electric wire routing cavity 37.

Namely, the arrangement section 44 of the electric wire routing cavity 37 in which the electric wire W1 of the arm-side wire harness W is arranged can be commonly used as an extra wire portion arrangement section in which the extra wire portion of the electric wire W1 caused by the pivoting of the arm body member 30 is arranged. This simplifies the structure of the arm body member 30 compared to a configuration separately including an extra wire portion arrangement section.

OTHER EMBODIMENTS

The technology disclosed herein is not limited to the embodiment described above and illustrated in the drawings. For example, the following embodiments will be included in the technical scope of the technology.

(1) In this embodiment, the armrest 20 is mounted on the seat 80 of a vehicle. However, the armrest may be mounted on a seat of an aircraft, a ship, or a train and may be mounted on any component as necessary.

(2) In the above embodiment, the armrest 20 is mounted on the left side portion of the seat 80. However, the armrest may be mounted on a right side portion of a seat or right and left side portions of a seat.

(3) In the above embodiment, the seat-side connector 97 is inserted into the arrangement section 44 through the connector insertion hole when the arm body member 30 is fixed to the bracket 91 of the seat frame 90. However, the seat-side connector may not be inserted into the arrangement section through the connector insertion hole as long as the opening hole of the seat-side connector faces the connector insertion hole.

(4) In the above embodiment, the arm body member 30 is pivotable with respect to the bracket 91 of the seat frame 90. However, the arm body member may be fixed to the bracket so as not to pivot.

EXPLANATION OF SYMBOLS

10: seat with an armrest
20: armrest
30: arm body member
35: side wall (one example of the mount member-side wall)
37: electric wire routing cavity
38: arm-side connector
40A: seat-side wall (one example of the mount member-side wall)
44: arrangement section (one example of the electric wire routing cavity)
47: connector insertion hole
48: operation hall
50: second cover (one example of the cover)
80: seat (one example of the mount member)
90: seat frame (one example of the mount member)
91: bracket (one example of the mount member)
97: seat-side connector (one example of the mount member-side connector)
B: support bolt (one example of the rotation axis)
W: arm-side wire harness
W1: electric wire

What is claimed is:

1. An armrest comprising:
an arm-side wire harness including an electric wire and an arm-side connector that is on an end of the electric wire and is couplable to a mount member-side connector mounted on a mount member; and
an arm body member including an electric wire routing cavity in which the electric wire of the arm-side wire harness is arranged and a mount member-side wall that is to be arranged opposite the mount member, the arm body member to be fixed to the mount member while the mount member-side wall is opposite the mount member, wherein
the mount member-side wall includes a connector insertion hole through which the arm-side connector is insertable,
the arm body member includes an operation hole that is continuous from the connector insertion hole via the electric wire routing cavity,
the operation hole of the arm body member is open in a direction opposite from the mount member, and
the armrest further includes a cover body that covers the operation hole.

2. The armrest according to claim 1, wherein the cover body is part of a cover that is attached to the arm body member to close the operation hole.

3. The armrest according to claim 1, wherein when the arm body member is fixed to the mount member, the mount member-side connector and the arm-side connector that are coupled are inserted in the connector insertion hole.

4. The armrest according to claim 1, wherein the electric wire having a length including a coupling stroke length necessary for coupling the mount member-side connector and the arm-side connector is arrangeable in the electric wire routing cavity.

5. A seat with an armrest comprising:
the armrest according to claim 1; and the mount member, wherein
the mount member is the seat, and
the mount member-side connector is fixed to the mount member so as to face the connector insertion hole when the arm body member is fixed to the mount member.

6. The seat with the armrest according to claim 5, wherein the arm body member is pivotable around an axis extending from the mount member to the arm body member, and
the electric wire having an extra length necessary for pivoting the arm body member is arrangeable in the electric wire routing cavity.

* * * * *